(12) United States Patent
Asanuma et al.

(10) Patent No.: US 11,336,831 B2
(45) Date of Patent: May 17, 2022

(54) IMAGE PROCESSING DEVICE, CONTROL METHOD, AND PROGRAM STORAGE MEDIUM

(71) Applicant: CANON KABUSHIKI KAISHA, Tokyo (JP)

(72) Inventors: Tomoya Asanuma, Kawasaki (JP); Genki Cho, Kawasaki (JP); Hiroto Oka, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 573 days.

(21) Appl. No.: 16/502,250

(22) Filed: Jul. 3, 2019

(65) Prior Publication Data
US 2020/0014856 A1  Jan. 9, 2020

(30) Foreign Application Priority Data

Jul. 6, 2018 (JP) .............................. JP2018-129070
Jul. 6, 2018 (JP) .............................. JP2018-129182

(51) Int. Cl.
*H04N 5/232* (2006.01)
*G06T 1/00* (2006.01)
*G06T 7/73* (2017.01)

(52) U.S. Cl.
CPC ....... *H04N 5/23299* (2018.08); *G06T 1/0014* (2013.01); *G06T 7/73* (2017.01);
(Continued)

(58) Field of Classification Search
CPC ............... H04N 5/23296; H04N 5/247; H04N 5/232933; H04N 5/23206;
(Continued)

(56) References Cited

U.S. PATENT DOCUMENTS 5,838,368 A * 11/1998 Masunaga .......... H04N 5/23203
348/169
6,744,461 B1 * 6/2004 Wada ....................... H04N 7/18
348/169
(Continued)

FOREIGN PATENT DOCUMENTS

CN   1892677 A   1/2007
CN   1981302 A   6/2007
(Continued)

OTHER PUBLICATIONS

The above documents were cited in a Mar. 17, 2021 Chinese Office Action, which is enclosed with an English Translation, that issued in Chinese Patent Application No. 201910603870.0.

*Primary Examiner* — Pritham D Prabhakher
(74) *Attorney, Agent, or Firm* — Cowan, Liebowitz & Latman, P.C.

(57) ABSTRACT

An image processing device adjusts an imaging direction and an imaging magnification by performing driving control of an imaging device for each image processing process and sets an imaging position of a measurement target. The image processing device calculates an evaluation value of set feature parts in a captured image input at the time of measurement on the basis of captured image data and compares the evaluation value with determination conditions. If the determination condition is satisfied, the image processing device performs predetermined image processing and outputs a result of the image processing to a control device.

23 Claims, 18 Drawing Sheets

(52) U.S. Cl.
CPC ..... *H04N 5/23206* (2013.01); *H04N 5/23229* (2013.01); *H04N 5/23264* (2013.01)

(58) Field of Classification Search
CPC ......... H04N 5/232945; H04N 5/23218; H04N 5/23203; H04N 5/23264; H04N 5/23254; H04N 5/23299; H04N 5/23216; H04N 5/232; H04N 5/23229; G06T 7/73; G06T 1/0014
USPC ........................................................ 700/259
See application file for complete search history.

(56) References Cited

U.S. PATENT DOCUMENTS

| | | | | |
|---|---|---|---|---|
| 6,909,458 | B1* | 6/2005 | Suzuki | H04N 5/23203 |
| | | | | 348/211.8 |
| 7,432,953 | B2* | 10/2008 | Washisu | H04N 5/2327 |
| | | | | 348/208.11 |
| 8,120,697 | B2 | 2/2012 | Toguchi | |
| 8,503,723 | B2 | 8/2013 | Kubota | |
| 8,831,330 | B2* | 9/2014 | Fujikawa | G06T 7/0004 |
| | | | | 382/141 |
| 8,934,704 | B2* | 1/2015 | Hirano | G06T 7/001 |
| | | | | 382/148 |
| 9,609,227 | B2 | 3/2017 | Uemura et al. | |
| 9,741,108 | B2* | 8/2017 | Ikeda | G06T 1/0007 |
| 10,088,302 | B2* | 10/2018 | Takahashi | G06T 7/0004 |
| 2004/0056964 | A1* | 3/2004 | Kawai | H04N 5/23203 |
| | | | | 348/E5.043 |
| 2006/0104625 | A1* | 5/2006 | Oya | H04N 5/23299 |
| | | | | 396/428 |
| 2007/0002315 | A1 | 1/2007 | Ban et al. | |
| 2010/0226561 | A1* | 9/2010 | Fujikawa | G06T 7/0004 |
| | | | | 382/141 |
| 2010/0289940 | A1 | 11/2010 | Toguchi | |
| 2013/0177250 | A1* | 7/2013 | Yamamoto | G06T 7/0004 |
| | | | | 382/195 |
| 2014/0074977 | A1* | 3/2014 | Niida | H04N 21/8453 |
| | | | | 709/217 |
| 2014/0198210 | A1* | 7/2014 | Lee | H04N 5/23206 |
| | | | | 348/143 |
| 2015/0116517 | A1 | 4/2015 | Kinoshita | |
| 2015/0262030 | A1 | 9/2015 | Kawabata | |
| 2017/0041530 | A1* | 2/2017 | Kimura | H04N 5/23216 |
| 2017/0311037 | A1* | 10/2017 | Ohmura | H04N 7/181 |
| 2018/0227499 | A1* | 8/2018 | Lee | H04N 5/23299 |
| 2018/0316877 | A1* | 11/2018 | Gruenke | G06T 7/73 |
| 2019/0149744 | A1* | 5/2019 | Fukunaga | H04N 5/247 |
| | | | | 348/207.1 |
| 2020/0059595 | A1* | 2/2020 | Ono | B64C 39/024 |

FOREIGN PATENT DOCUMENTS

| | | |
|---|---|---|
| CN | 101996408 A | 3/2011 |
| CN | 102144156 A | 8/2011 |
| CN | 104915633 A | 9/2015 |
| JP | 2015-097301 A | 5/2015 |
| JP | 2015-125196 A | 7/2015 |
| JP | 2015-186021 A | 10/2015 |

* cited by examiner

FIG. 9A

| Imaging part ID | Camera ID | Panning direction | Tilting direction | Zooming magnification | Feature extracting method | Vibration amount calculating method | Static stability determination setting | Determination level | Measurement interval (Times/Sec) | Measurement time (Numerical value) | Measurement time (Unit) | Threshold (Numerical value) | Threshold (Unit) | Reference feature information ID |
|---|---|---|---|---|---|---|---|---|---|---|---|---|---|---|
| 01 | 01 | 10.0 | -5.0 | 1.0 | Pattern matching | Pattern position | Detailed | Null | 20 | 3 | Seconds | 1 | Millimeter | A,B,C,D |
| 02 | 01 | -15.5 | -4.5 | 1.2 | Pattern matching | Pattern position | Simple | 1 | 1 | 5 | Seconds | 5 | Centimeter | E |

FIG. 9B

| Reference feature information ID | X coordinate | Y coordinate | Width | Height | Feature quantity | Reference image area image file name |
|---|---|---|---|---|---|---|
| A | 860 | 520 | 80 | 60 | 5e7f4308··· | IMG_A.jpg |
| B | 670 | 450 | 40 | 30 | 9a7046d4··· | IMG_B.jpg |

FIG. 16A

| Imaging part ID 1801 | Camera ID 1802 | Panning direction 1803 | Tilting direction 1804 | Zooming magnification 1805 | Feature extracting method 1806 | Error calculating method 1807 | Escape condition (Numerical value) 1808 | Escape condition (Unit) 1809 | Allowed error (Numerical value) 1810 | Allowed error (Unit) 1811 | Reference feature information ID 1812 |
|---|---|---|---|---|---|---|---|---|---|---|---|
| 01 | 01 | 10.0 | -5.0 | 1.0 | Pattern matching | Pattern position | 5 | Times | 5 | Pixels | A,B,C,D |
| 02 | 01 | -15.5 | -4.5 | 1.2 | Pattern matching | Pattern position | 10 | Seconds | 20 | cm | E |

FIG. 16B

| Reference feature information ID 1812 | X coordinate 1813 | Y coordinate 1814 | Width 1815 | Height 1816 | Feature quantity 1817 | Reference image area image file name 1818 |
|---|---|---|---|---|---|---|
| A | 860 | 520 | 180 | 60 | 5e7f4308··· | IMG_A.jpg |
| B | 670 | 450 | 40 | 30 | 9a7046d4··· | IMG_B.jpg |

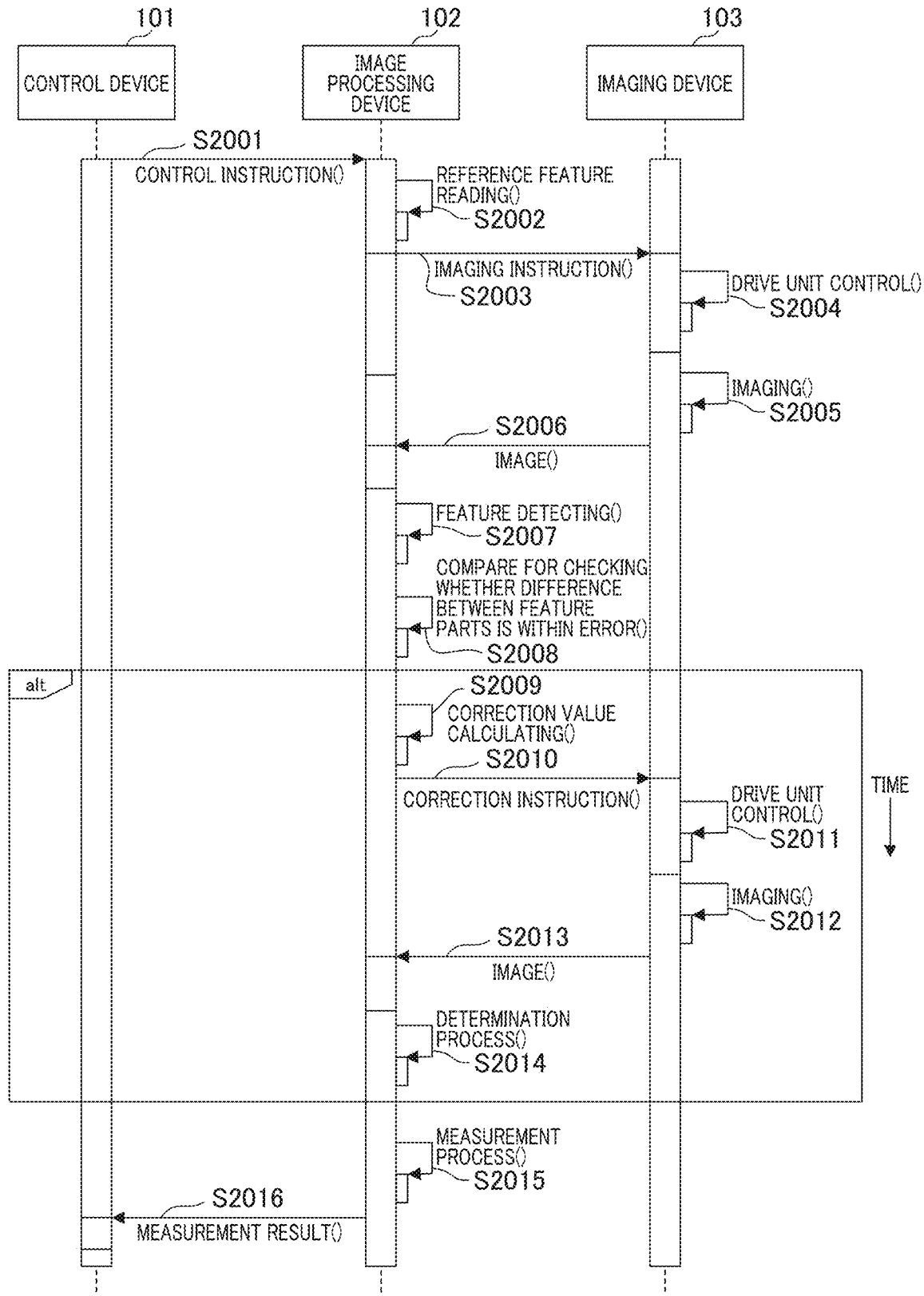

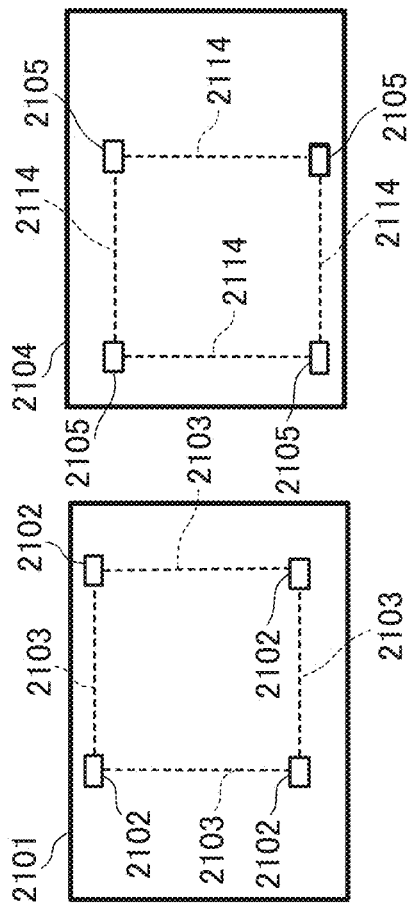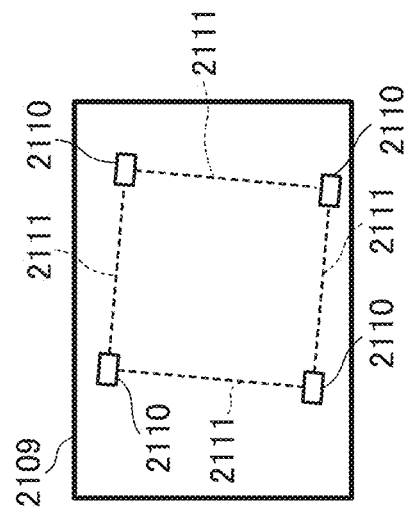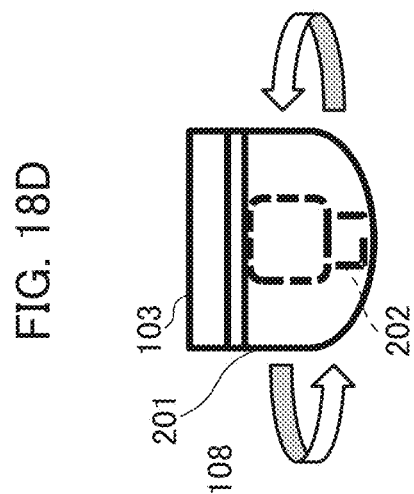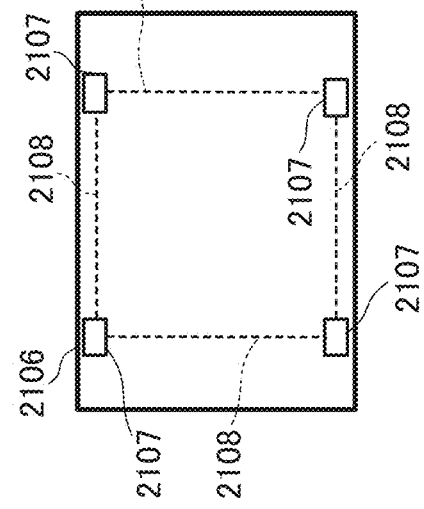

IMAGE PROCESSING DEVICE, CONTROL METHOD, AND PROGRAM STORAGE MEDIUM

BACKGROUND OF THE INVENTION

Field of the Invention

The present invention relates to a technology of image processing for processing a captured image by controlling an imaging direction and an imaging angle of view of an imaging device.

Description of the Related Art

Technologies for controlling devices such as a robot and a conveying device by performing image processing are used for product manufacturing, quality checking, operating, management, and the like in a factory. When a work target (hereinafter, referred to as a workpiece) is imaged using an imaging device, in a case in which an imaging device including a drive unit changing an imaging direction and an imaging magnification is used, images can be acquired at a plurality of imaging positions with a plurality of imaging angles of view. An image acquired by one imaging device can be used in a plurality of image processes.

However, depending on the performance of a drive unit included in an imaging device and installation environments of the imaging device, there is a possibility that the measurement accuracy of image processing will not be sufficient. For example, even when an imaging position of an imaging device reaches a desired position, if vibration of the imaging device has not been sufficiently resolved, and an image that has been captured in a state which is not sufficiently statically determinate is used, there is a possibility that the measurement accuracy of image processing will be low. In Japanese Patent Laid-Open No. 2015-97301, a technology of determining whether or not a camera is in a stable imaging state for an image captured by the camera is disclosed. A stable image is acquired using a result of the determination, and image processing can then be performed with high measurement accuracy.

In addition, when the reproducibility of an imaging position that is set as a reference in advance is lowered due to the performance, deterioration, and the like of the drive unit of the imaging device, there is a possibility that the measurement accuracy or a recognition rate of image processing will decrease. Thus, in the technology disclosed in Japanese Patent Laid-Open No. 2015-186021, a first image acquired by imaging a workpiece in advance is compared with a second image acquired by imaging the workpiece when the imaging position is changed, and an area of the second image in which the first image is present can be acquired and displayed.

However, a method in which a user checks the reproducibility each time an imaging position is changed in a factory or the like takes time, and the working efficiency thereof is low. For this reason, there is demand for an imaging device to automatically determine the reproducibility and perform a process of automatically correcting an imaging position if the reproducibility is low. In addition, the measurement accuracy and the recognition rate that are required in each image processing in a factory or the like may be different. As a result of performing a correction process to an extent greater than necessary in accordance with a measurement accuracy insufficient to that required in certain image processing or demand for excessive reproducibility, there is a possibility that a long measurement time may be required.

In addition, in a factory or the like, the required measurement accuracy may be different in accordance with a type of image processing or a workpiece that is used. For this reason, even in image processing performed after a statically determinate state of the imaging device is confirmed, a required measurement accuracy may not be satisfied. In addition, when a time required until the imaging device can be brought into a statically determinate state satisfying the required measurement accuracy becomes long, this becomes a cause of an increase in the overall processing time.

As one example, a work process in which workpieces of a plurality of types that are individually conveyed by a conveying device are classified using images captured by an imaging device, and a robot loads the workpieces into different conveying vehicles for types of workpiece will be assumed. In order to allow a robot to correctly recognize workpiece coordinates and grip a workpiece, it is necessary to increase the measurement accuracy of image processing such that it becomes equal to or higher than a predetermined accuracy. On the other hand, in a process in which an imaging device images a conveying vehicle and determines whether or not the conveying vehicle is within a stop range, the measurement accuracy of image processing does not need to be as high, and it is required to be able to end the processing in a shorter time.

SUMMARY OF THE INVENTION

The present invention provides an image processing device that performs image processing in a shorter time while securing reproducibility of an imaging position.

An image processing device according to one embodiment of the present invention is an image processing device that processes data of a captured image acquired by imaging a measurement target using an imaging unit capable of changing an imaging direction or an imaging angle of view, comprising: at least one processor functioning as: a calculation unit configured to calculate an evaluation value on the basis of a captured image acquired at an imaging position at the time of measurement by the imaging unit and reference features of the image; an image processing unit configured to acquire the data of the captured image using the imaging unit and perform image processing; a first setting unit configured to set determination conditions used for determining reproducibility of an imaging position of the imaging unit; and a control unit configured to perform control of performing image processing of the captured image using the image processing unit and outputting a result of the image processing if the evaluation value calculated by the calculation unit satisfies the determination conditions set by the first setting unit.

Further features of the present invention will become apparent from the following description of exemplary embodiments (with reference to the attached drawings).

BRIEF DESCRIPTION OF THE DRAWINGS

FIGS. 9A and 9B are diagrams illustrating a data format of reference feature information according to the first example;

FIGS. 16A and 16B are diagrams illustrating a data format of reference feature information according to the fourth example;

FIG. 17 is a sequence diagram of a measurement process according to the fourth example;

FIGS. 18A to 18E are explanatory diagrams of a comparison process and a correction process according to the fourth example.

DESCRIPTION OF THE EMBODIMENTS

Here, a preferred embodiment of the present invention will be described in detail according to respective examples illustrated in the accompanying drawings. Although an example of a system including an image processing device, a robot, a conveying device, and the like will be described, each constituent element illustrated in the following embodiment is one example, and the present invention can be applied to various measurement systems using image processing devices.

If an imaging device includes a vibration sensor, a statically determinate state of the imaging device can be determined using a detection value acquired by the vibration sensor. However, if the imaging device does not include a vibration sensor, a different unit is necessary. In examples 1 to 3, a configuration in which a determination process of determining a statically determinate state of the imaging device is performed by an image processing unit will be described.

First Example

Figure 1:
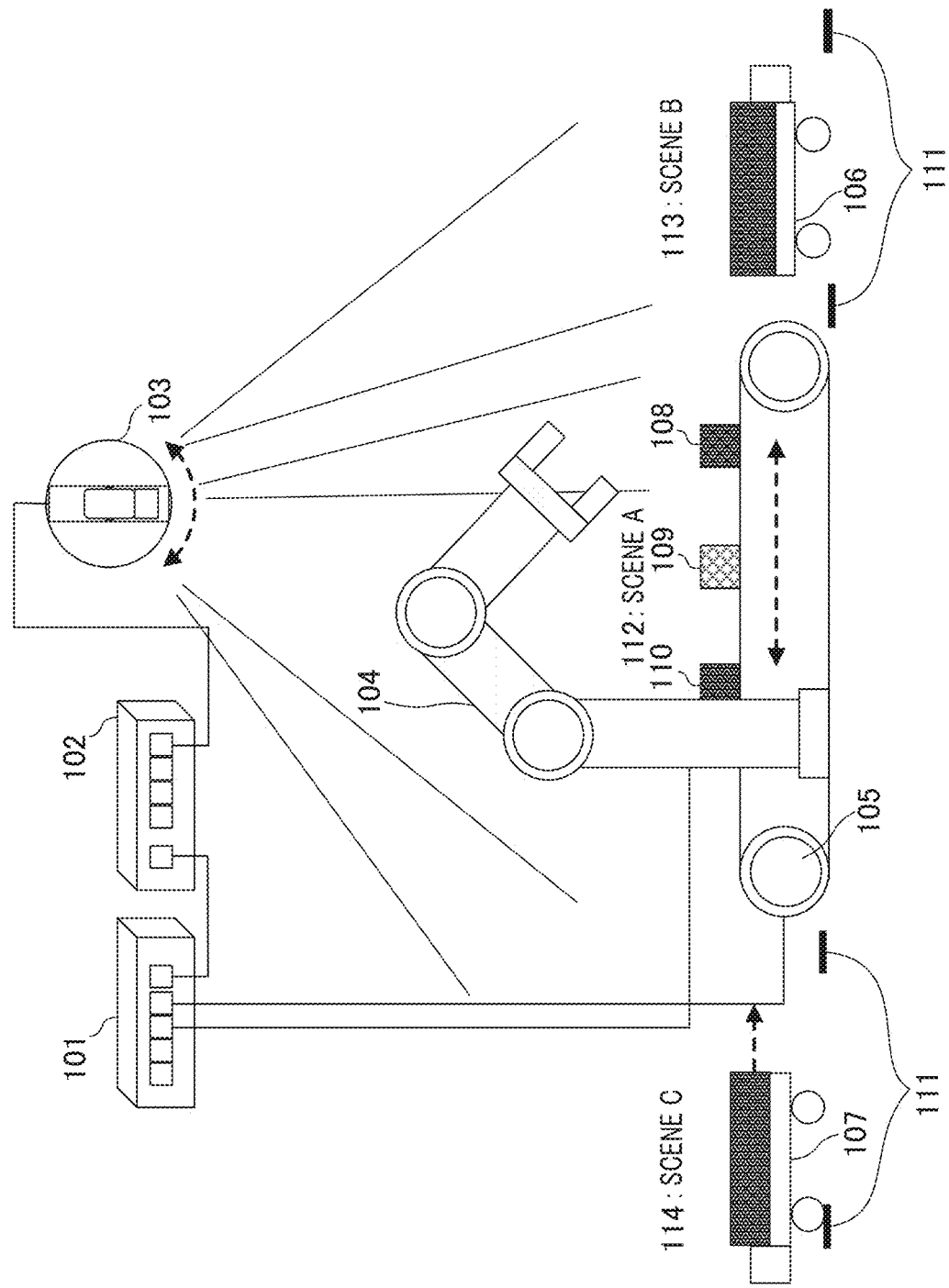
FIG. 1 is an overall configuration diagram of a system including an image processing device according to a first example.

FIG. 1 is an overall configuration diagram of a system including an image processing device according to this embodiment. A control device 101 of the system transmits a control instruction to each device at a timing set in advance. The system is configured using a control device 101, an image processing device 102, an imaging device 103, a robot 104 used for a workpiece, a conveying device 105, and conveying vehicles 106 and 107.

The image processing device 102 performs driving control of the imaging device 103 in accordance with a control instruction received from the control device 101. The imaging device 103 has an imaging direction and an imaging angle of view that can be changed and performs an imaging operation with an imaging position of a measurement target changing in accordance with a control signal transmitted from the image processing device 102. The image processing device 102 processes captured image data acquired from the imaging device 103 and transmits a result of the image processing to the control device 101. The control device 101 executes predetermined work by controlling the robot 104, the conveying device 105, and the conveying vehicles 106 and 107 on the basis of the result of the image processing.

As one example, the following work processes will be described.

A process of determining types of workpieces 108 to 110 conveyed by the conveying device 105 using image data captured by the imaging device 103

A process in which workpieces are disposed in different conveying vehicles for each type of workpiece by the robot 104

Stop positions of the conveying vehicles 106 and 107 conveying workpieces are determined by a plurality of stop frames 111.

Figure 2:
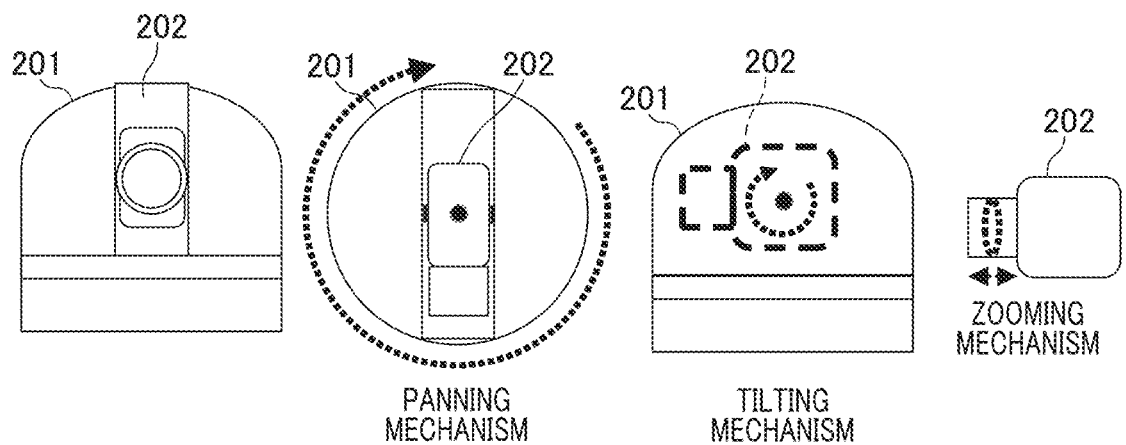
FIG. 2 is a schematic view of an imaging device according to the first example.

FIG. 2 is a schematic view illustrating a drive mechanism that changes an imaging direction and an imaging angle of view of the imaging device 103. The imaging device 103 includes a camera platform 201 and an imaging system (imaging optical system) 202. The camera platform 201 includes mechanism parts of two drive systems that change the direction of the imaging system 202 in a horizontal direction (hereinafter, a panning direction will be referred to as a direction P) or a vertical direction (hereinafter, a tilt direction will be referred to as a direction T). A panning mechanism (also referred to as a pan mechanism) is a mechanism that drives the imaging system 202 in the direction P, and a tilting mechanism (also referred to as a tilt mechanism) is a mechanism that drives the imaging system 202 in the direction T. By using such mechanisms, the imaging direction of the imaging system 202 can be changed in the range of 360° in the direction P, in other words, can be turned endlessly. In addition, the imaging direction can be changed in the range of −30.0 degrees to +210.0 degrees in the direction T with the horizontal direction set as 0 degrees. Furthermore, the imaging device 103 can change the zoom magnification of the imaging system 202 in the range of 1.0 times to 20.0 times using a zooming mechanism.

In this way, the imaging device 103 can change the imaging position and the imaging angle of view in accordance with control of the imaging direction and the zoom magnification and, for example, can image the following measurement situations.

Measurement situation A112 for detecting types of workpieces 108 to 110

Measurement situation B113 and measurement situation C114 for respectively determining whether or not the conveying vehicles 106 and 107 are within a stop frame 111

In this embodiment, for the convenience of description, although an example of use of one imaging device will be described, a plurality of imaging devices are used in a system of a larger size. Each imaging device is responsible for imaging a plurality of measurement situations. In addition, imaging devices may be configured to include a vibration detecting sensor such as a gyro sensor.

Figure 3A:
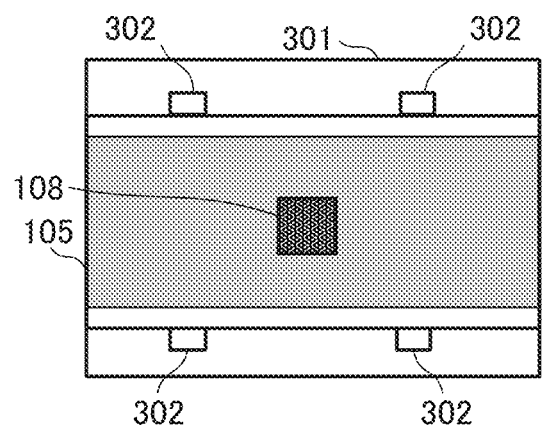
FIGS. 3A and 3B are explanatory diagrams of measurement situations according to the first example.
Figure 3B:
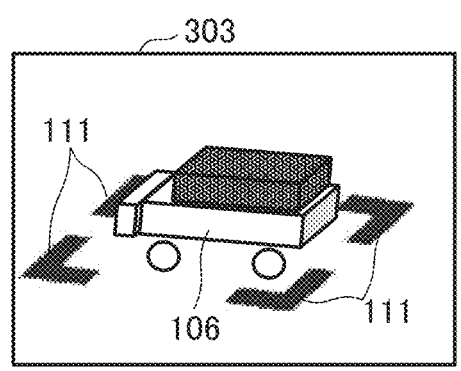

FIGS. 3A and 3B are diagrams illustrating the measurement situations A112 and B113. FIG. 3A illustrates an example of an image of the measurement situation A112, and FIG. 3B illustrates an example of an image of a measurement situation B113. An image 301 illustrated in FIG. 3A is an image acquired by the imaging device 103 imaging a workpiece 108 on the conveying device 105. The image processing device 102 processes data of the image 301 and calculates actual spatial coordinates of the workpiece 108. The control device 101 controls the robot 104 on the basis of a result of the image processing. At this time, when the position reproducibility of the imaging device 103 decreases, an error between the coordinates of the position/posture of the workpiece 108 calculated by the image processing device 102 and actual coordinates of the position/posture of the workpiece 108 occurs. If the error exceeds an allowed range, there is a possibility that an error will occur in the control of the robot 104, and a problem will be caused in a gripping or picking-up operation for the workpiece 108.

Thus, the image processing device 102 performs imaging after the imaging position of the imaging device 103 is changed and determines a statically determinate state thereof. While a reference image area will be described later, for example, as in an area 302 in which a bolt or a pillar fixing the conveying device 105 is shown, an area having little variation according to elapse of time and a large feature quantity is appropriate as the reference image area. In contrast to this, as in an area in which only the workpiece 108 and surrounding parts thereof are shown, an area in which a position or an inclination changes in accordance with the elapse of time in a moving image is not appropriate as a reference image area.

The imaging device 103 transmits data of the image 301 including the reference image area 302 to the image processing device 102. Alternatively, the imaging device 103 may transmit image data acquired by trimming the reference image area 302 to the image processing device 102. Alternatively, the imaging device 103 may extract a feature part inside the image to be described later by performing image processing of the image 301 and transmit only data representing a result of the extraction to the image processing device 102.

An image 303 illustrated in FIG. 3B is an image acquired by imaging the conveying vehicle 106 using the imaging device 103. The image processing device 102 performs image processing on the image 303 and determines whether or not the conveying vehicle 106 is present within the stop frame 111. At this time, a determination accuracy of a statically determinate property required for the imaging device is assumed to be lower than that of the measurement situation A112. In contrast, in a case in which an excessive statically determinate property is required, a situation in which the measurement time required for the overall process is too long may occur, due to the time required to reach a statically determinate state.

Figure 4:
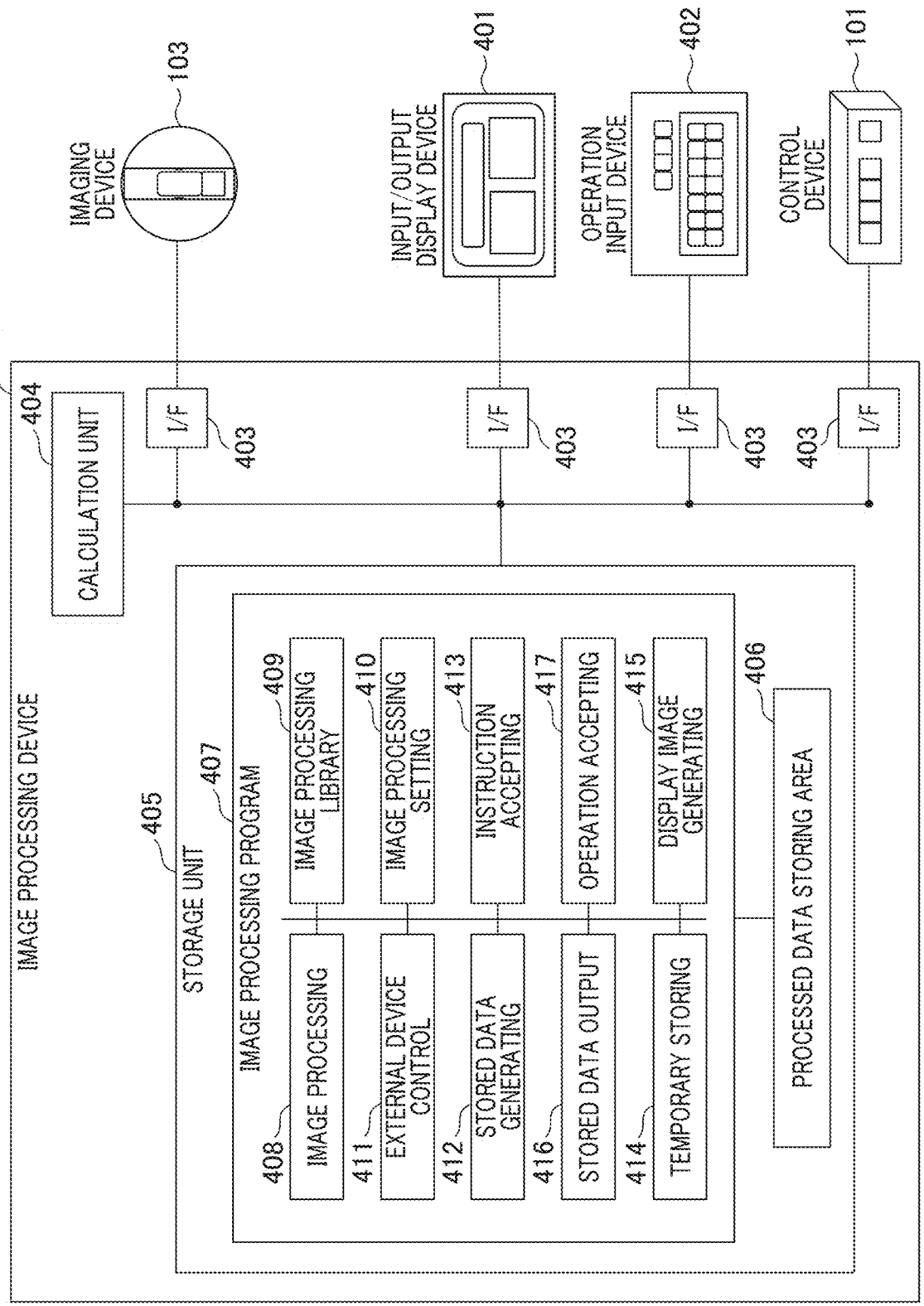
FIG. 4 is a block diagram of an image processing device according to the first example.

FIG. 4 is a block diagram illustrating an example of the configuration of the image processing device 102. The image processing device 102 is connected to the control device 101 and the imaging device 103 through interface units 403. The input/output display device 401 and the operation input device 402 are user interface devices connected to the image processing device 102 through the interface units 403. Each device is connected through each interface unit 403 disposed on an internal bus of the image processing device 102. Each interface unit 403 is configured using a network interface unit corresponding to a connection target, a serial communication interface unit, and the like on the basis of specifications appropriate for communication.

The input/output display device 401 includes a display device such as a cathode ray tube, a liquid crystal panel, or the like that displays an image. The operation input device 402 is configured using a keyboard or a pointing device, a touch panel, an input operation controller, a gesture input device, and the like.

In the imaging device 103 connected to the image processing device 102, a lighting device may be additionally disposed as is necessary for imaging. The lighting device includes a light source such as a halogen lamp or a light emitting diode. In addition, the storage capacity may be extended by connecting an external storage device to the image processing device 102.

The image processing device 102 includes an arithmetic operation unit 404 configured using a central processing unit (CPU) configured as a general-purpose microprocessor that is a control subject of image processing, an image processing processor, and the like. The arithmetic operation unit 404 is connected to the storage unit 405 through internal buses (a data bus, an address bus, other control lines, and the like).

In the storage unit 405, a nonvolatile memory device such as a ROM, a RAM, an EPROM, an EEPROM or the like, or an external storage device is used. ROM is an abbreviation of "Read Only Memory", and RAM is an abbreviation of "Random Access Memory". EPROM is an abbreviation of "Erasable Programmable Read Only Memory". EEPROM is an abbreviation of "Electrically Erasable Programmable Read Only Memory". The external storage device, for example, is a storage device configured using a hard disk drive device (HDD) or a semiconductor memory device, a storage device that is connectable to the interface unit 403, or the like.

The storage unit 405 has a processed data storing area 406 and a program storage area. The processed data storing area 406 is configured using a RAM area of the storage unit 405, a file area and a virtual storage area of an external storage device, and the like. The processed data storing area 406 temporarily stores processed data and is used as a storage area for setting parameters of image processing and the like.

An image processing program 407 used for executing image processing of this example is stored in the program storage area of the storage unit 405. The image processing program 407 executes change of settings of the image processing and predetermined image processing in accordance with various operations performed by the operation input device 402. In addition, data of changed details can be stored in the processed data storing area 406, and the data can be deleted.

The image processing program 407 is configured using software modules realizing various functions. For example, the image processing module 408 is a main body part that realizes image processing. In the image processing performed by this module, an image processing library 409 is used. The image processing library 409, for example, is installed in the storage unit 405 as a library that is statically or dynamically linked. An image processing setting module 410 determines an action of the image processing program 407. The image processing setting is performed in accordance with various operations performed by the operation input device 402.

In addition, in the image processing program 407, input/output (I/O) subroutines realizing the following functions are included. For example, there are an external device control subroutine 411, a stored data generating subroutine 412, and an instruction accepting subroutine 413 used for accepting a control instruction from the control device 101. In addition, there are a temporary storing subroutine 414 using a RAM area, a cache area of the arithmetic operation unit 404, and the like and a display screen generating subroutine 415. A stored data output subroutine 416 is a program that reads and outputs data stored in the processed data storing area 406, and an operation accepting subroutine 417 is a program used for accepting an operation instruction from the operation input device 402. Each function is installed in the storage unit 405 in the form of an application (utility) program or a subroutine configured as a library that is linked statically or dynamically.

The CPU of the image processing device 102 executes the image processing program 407, thereby performing control of the imaging device 103 and image processing using the arithmetic operation unit 404. In addition, a process of accepting a user's operation instruction using the operation input device 402 and a process of accepting a control instruction from the control device 101 that is an external device of the image processing device 102 are executed. The arithmetic operation unit 404 performs an arithmetic operation process by calling each functional module of the image processing program 407 and a library in accordance with an operation instruction and a control instruction and transmits data of a result of the image processing to the control device 101. In addition, the data of the result of the image processing may be transmitted to an external storage device and be stored (logged) therein. In addition, a process of combining a screen configuration stored in advance and the result of the image processing on the screen using a program and displaying combined data in the input/output display device 401 may be executed.

Figure 5:
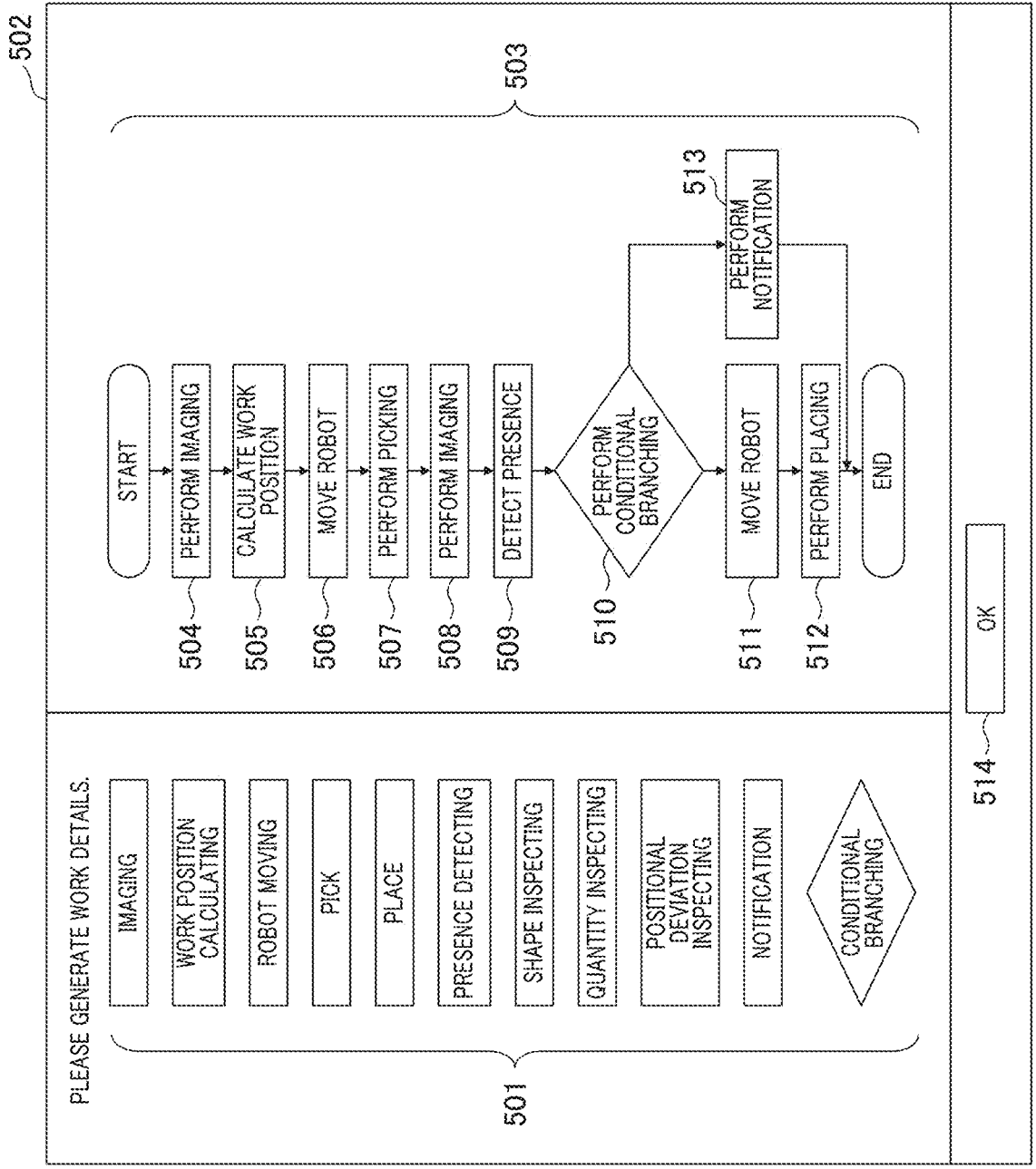
FIG. 5 is a diagram illustrating a flowchart generation screen according to the first example.

FIG. 5 is a diagram illustrating an example of a flowchart generation screen used for generating the image processing program 407. This screen is displayed in the input/output display device 401. The image processing program 407 according to this example is executed in accordance with a flowchart generated by a user using the image processing device 102. As another embodiment, there is a form in which a user generates the image processing program 407 using an image processing program generating device not illustrated in FIG. 1. In such a case, the generated image processing program 407 is transmitted to the storage unit 405 of the image processing device 102 and is stored therein. In addition, a form using a package function that includes combined image processing flowcharts prepared in a fixed form in advance for each function or each purpose may be employed. In such a case, a user can perform adjustment of parameters and the like by selecting a desired function on a graphical user interface (GUI).

A parts list 501 is a list of processing parts configuring a flowchart. A user can designate various processes indicated within rectangular frames and conditional branching processes indicated within rhombus frames. For example, a user designates a desired processing part from the parts list 501 using the operation input device 402. By combining a plurality of processing parts disposed in a flowchart area 502 using a line by performing a drag & drop operation using a pointing device or the like, a flowchart can be generated.

A flowchart 503 configured by a plurality of processing parts is an example in which a process of taking out workpieces 108 to 110 from the conveying device 105 using the robot 104 and disposing the workpieces in the conveying vehicle 106 or 107 in accordance with types of workpieces is described. In this example, an imaging process 504 after start of the process is a process of imaging the workpieces 108 to 110. The next process of workpiece position calculation 505 is a calculation process of calculating positions and phases of the workpieces 108 to 110, and the next process of robot movement 506 is a process of moving and rotating a hand of the robot 104 above the calculated workpiece position. A picking process 507 is a process of picking up the workpiece 108 using the robot 104, and the next imaging process 508 is a process of imaging the conveying vehicle 106. Next, a process of presence detection 509 of detecting whether or not an image area of the conveying vehicle 106 is present within a captured image is described. In addition, in a conditional branching process 510, it is described that the process proceeds to a robot movement process 511 in a case in which the image area of the conveying vehicle 106 is present within a captured image, and the process proceeds to a notification process 513 in a case in which the image area of the conveying vehicle 106 is not present within the captured image. The robot movement process 511 is a process of moving the workpiece 108 taken out by the robot 104 to the position of the conveying vehicle 106. A next placing process 512 is a process of the robot 104 placing the workpiece 108 on the conveying vehicle 106. The notification process 513 is a process of waiting for a predetermined time and notifying the occurrence of a detected abnormality. Then, a series of processes ends.

A user generates a flowchart 503 that is a target by combining desired processing parts. In the generated flowchart 503, if a double click operation is performed in one processing part, the process proceeds to a setting screen display process for setting a detailed process of the processing part. This setting screen will be described later. If a clicking operation on an OK button 514 is performed, the image processing device 102 generates an image processing program 407 for executing processes described in the flowchart.

Figure 6:
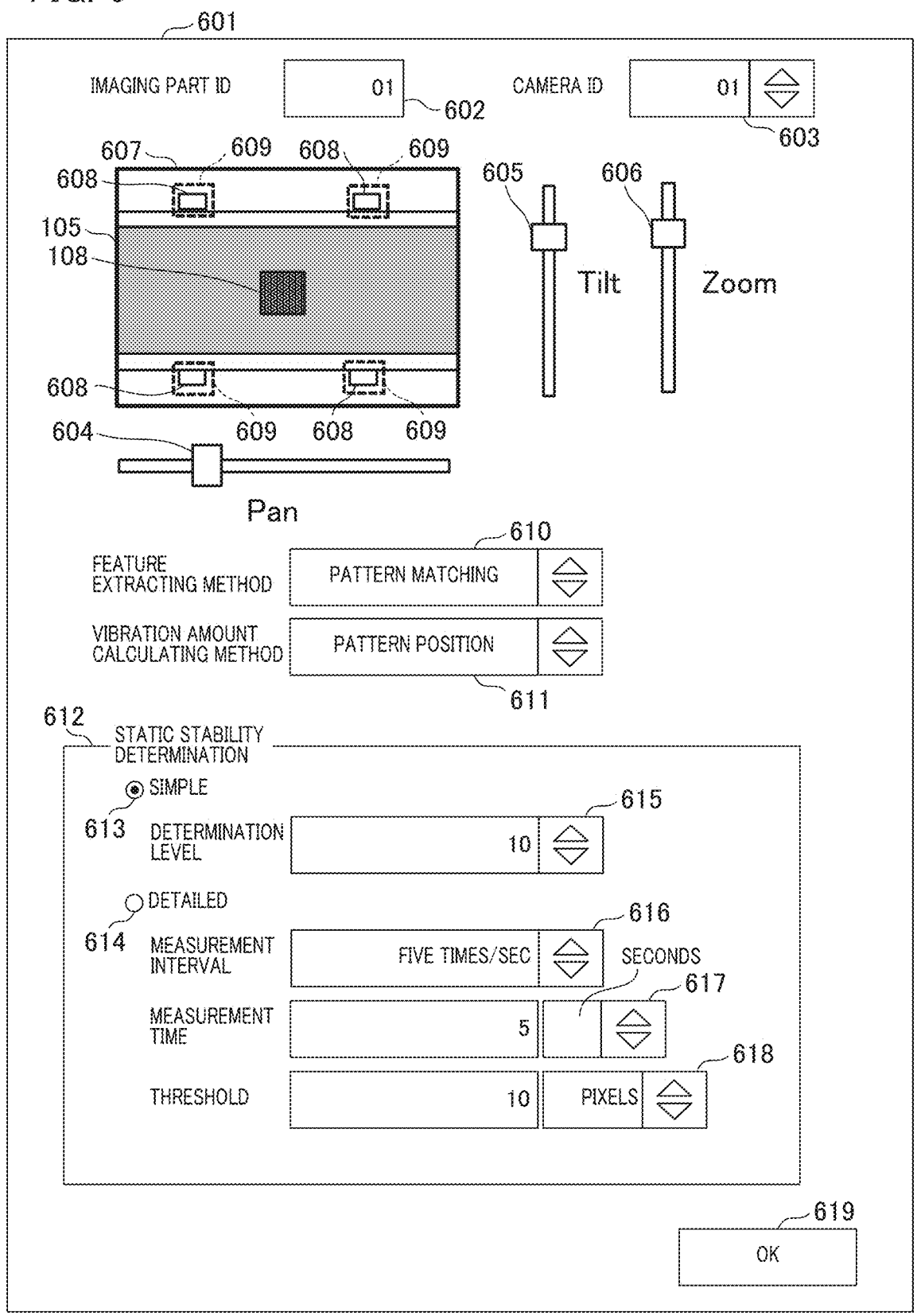
FIG. 6 is a diagram illustrating a reference feature registration processing screen according to the first example.

FIG. 6 is a diagram illustrating a reference feature registration processing screen in an imaging process. For example, in the flowchart 503 illustrated in FIG. 5, if a user performs a double click operation on a processing part of the imaging process 504 or 508, a registration processing screen 601 is displayed by the input/output display device 401. The user can perform setting registration of a reference feature used as a reference at the time of measurement while looking at the registration processing screen 601.

Figure 7:
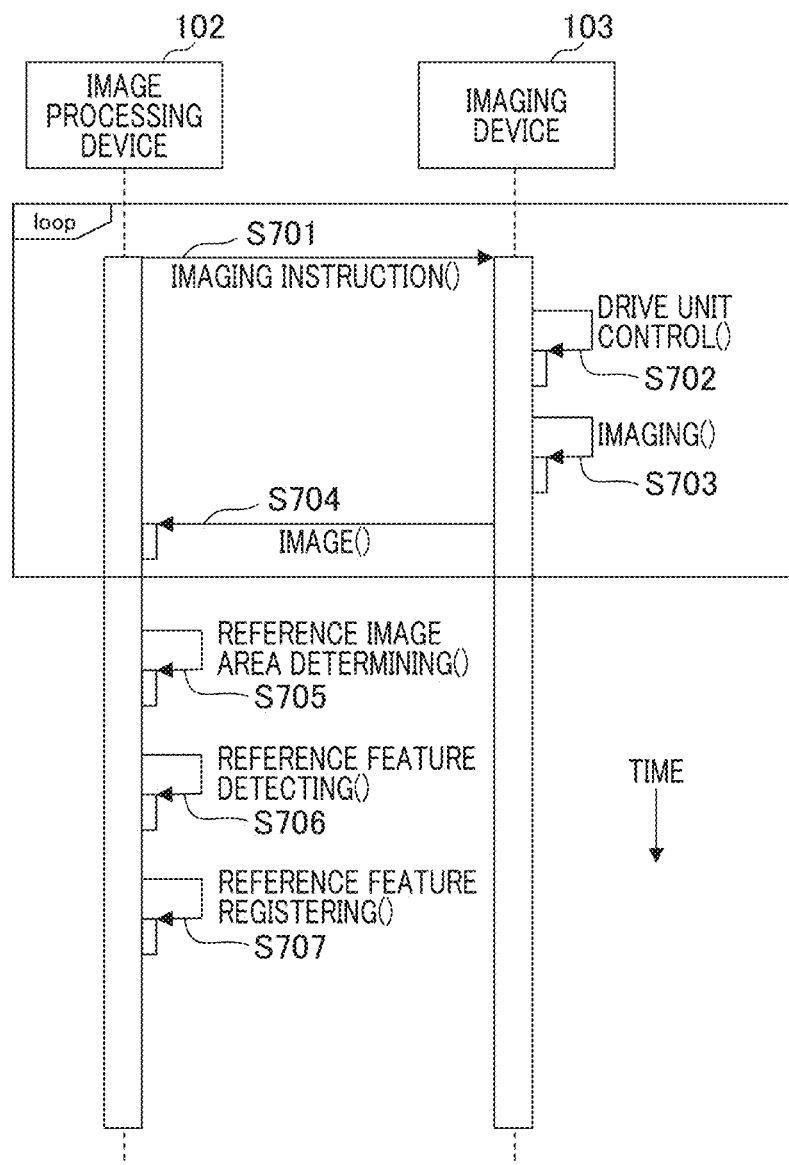
FIG. 7 is a sequence diagram of a reference feature registration process according to the first example.

FIG. 7 is a sequence diagram of a reference feature registration process. Hereinafter, a registration process configured from the following processes (A) to (C) will be specifically described with reference to FIGS. 6 and 7.

(A) Setting process of imaging device to be used (B) Setting process of panning, tilting, and zoom magnification relating to imaging position (C) A process of setting a reference feature part and determination conditions of a statically determinate state for evaluating a statically determinate state after driving of the drive mechanism unit based on the performance and deterioration of the drive mechanism unit included in the imaging device and the installation environment of the imaging device. In the drive mechanism unit, a panning mechanism, a tilt mechanism, and a zooming mechanism are included.

First, the process (A) will be described. An imaging part ID 602 illustrated in FIG. 6 is a box that displays information used for identifying an imaging part. A camera ID 603 is a spin box, in other words, a text box with spin control used for setting a camera ID that is identification information of the imaging device. If a plurality of imaging devices are used in a system, a user can set a camera to be used for imaging by selecting a camera ID. Here, a camera ID assigned to the imaging device 103 will be described as being designated.

Next, the process (B) will be described. Bars 604 to 606 illustrated in FIG. 6 are slide bars respectively operated for changing panning, tilting, and a zoom magnification of the imaging device 103. An image captured by the imaging device 103 is displayed in an image display area 607, and the bar 604 for panning is disposed on the side below thereof. An imaging position in a direction P can be changed in accordance with an operation of the bar 604. The bar 605 for tilting and the bar 606 for changing the zoom magnification are disposed on the right side of the image display area 607. An imaging position in a direction T can be changed in accordance with an operation of the bar 605. An imaging angle of view can be changed in accordance with an operation of the bar 606.

FIG. 7 illustrates one example of a process performed between the image processing device 102 and the imaging device 103. The direction of a time axis is defined as being a direction from the upper side to the lower side in FIG. 7. If a desired bar among the bars 604 to 606 is operated by a user, the image processing device 102 transmits an imaging instruction to the imaging device 103 (S701). The imaging device 103 performs changing of panning or tilting (changing of an imaging direction) or changing of a zoom magnification by controlling the drive unit (S702). Thereafter, an imaging operation using the imaging device 103 is performed (S703), and data of a captured image is transmitted to the image processing device 102 (S704). The image processing device 102 performs a display process of displaying a captured image, and the captured image is displayed in the image display area 607 on the screen of the input/output display device 401. The conveying device 105 illustrated in FIG. 1, a workpiece 108 that is in the middle of being conveyed, and a bolt part 608 fixing the conveying device 105 (corresponding to the area 302 illustrated in FIG. 3A) are shown in the example of the image illustrated in FIG. 6. The processes of S701 to S704 are repeatedly executed each time a user operates a slide bar (one of slide bars 604 to 606) as a looping process.

Next, the process (C) will be described. The object of the process (C) is for determining the statically determinate state of the imaging device 103 using image processing. A frame 609 denoted using dotted lines inside the image display area 607 illustrated in FIG. 6 is a frame used for a user to register a reference image area. A user can change a shape, a position, a size, and the like of the frame 609 using the operation input device 402. In FIG. 6, an image area of each bolt part 608 fixing the conveying device 105 is surrounded by a frame 609, and an area within four frames 609 is designated as a reference image area. In S705 illustrated in FIG. 7, a determination process of determining a reference image area is illustrated. The frames 609 may be added or deleted. For example, when a user performs a right-side clicking operation of a mouse, a context menu (not illustrated in the drawing) may be displayed, and, when the user selects "addition/deletion of a frame", an operation of adding or deleting a frame can be performed.

In a middle part of the registration processing screen 601 illustrated in FIG. 6, two spin boxes 610 and 611 are illustrated. The spin box 610 is used when a feature extracting method of extracting a reference feature from a reference image area is set. As the feature extracting method, pattern matching, edge detection, detection of gradation, binarization center of gravity, and use of a circumscribing rectangle, perimeter, color, or the like may be selected. The reference feature is a position and a phase of a pattern, an edge, a gradation value, an area and a position of a binarized area, a size, a position and an inclination of a rectangle, a length, a color density value, and the like. A user can designate a desired option in the spin box 610.

The spin box 611 is used when a vibration amount calculating method is selected. The vibration amount calculating method is a method based on a reference feature and a feature (similar to the reference feature, a position and a phase of a pattern, an edge, a gradation value, an area and a position of a binarized area, a size, a position and an inclination of a rectangle, a length, a color density value, and the like) extracted at the time of measurement to be described later. Here, the vibration amount is one example of an evaluation value.

In the method of determining a statically determinate state, for a reference feature part having a reference feature and a feature part having an extracted feature, a positional relation and the like between the feature parts can be selected. For example, a degree of matching between patterns, a difference between positions of centers of gravity of edges or areas, a difference between sizes of rectangles, a difference between distances between position coordinates, a difference between gradients, a difference between lengths, a difference between gradations, or the like can be selected. There may be a configuration in which a combination of two or more calculation methods are used in a plurality of statically determinate state determining methods.

A control 612 illustrated in FIG. 6 is used when a setting for determining the statically determinate state of the imaging device is performed. When statically determinate determination conditions are designated, a user can select a radio button 613 or 614. The radio button 613 is selected if determination conditions of a statically determinate state are desired to be set simply. The radio button 614 is selected if determination conditions for a statically determinate state are desired to be set in detail.

If the radio button 613 is selected, a determination level can be set in the spin box 615. A minimum value and a maximum value of a determination level that can be set in the spin box 615 are defined. This is based on a set of a measurement interval, a measurement time, and a threshold to be described later. For example, if the determination level is "1", it is assumed that the imaging device is used in an environment not requiring high measurement accuracy. In such a case, a measurement interval of one time/sec, a measurement time of 10 seconds, and a threshold of 3 centimeters are set. In addition, if the determination level is "10", it is assumed that the imaging device is used in an environment requiring measurement accuracy. In this case, a measurement interval of 30 times/sec, a measurement time of 5 seconds, and a threshold of 1 millimeter are set. In this way, a set of known set values according to a determination level can be selected.

On the other hand, if the radio button 614 is selected, a setting that is more detailed than a value that can be set as the determination level can be performed. In such a case, a measurement interval, a measurement time, and a threshold can be individually set in spin boxes 616, 617, and 618. Here, a measurement interval, a measurement time, and a threshold used for determining a statically determinate state will be described with reference to FIGS. 8A and 8B.

In the example described above, although the determination condition for a statically determinate state is set on the basis of a user operation, the determination condition may be automatically set by the image processing device 102. For example, a default value of the determination level described above may be automatically determined as a recommended value on the basis of the size of the workpiece, a type of process for the workpiece (gripping, placement at a predetermined position, or the like), the type of imaging device, and the like. From such information, a measurement error required for each process can be predicted to some degree, and accordingly, determination conditions are set using such information.

Figure 8A:
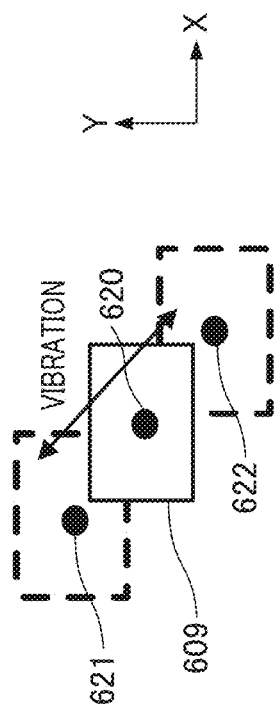
FIGS. 8A and 8B are diagrams illustrating a determination process of determining a statically determinate state according to the first example.

FIG. 8A is a schematic view illustrating positions 620, 621, and 622 of centers of gravity of detection patterns when a frame representing a reference feature part (hereinafter, referred to as a feature frame) 609 vibrates. This vibration is a relative vibration of the feature frame 609 of a captured image that is generated in accordance with a vibration of the imaging device and is not a natural vibration of a subject corresponding to the reference feature part. A direction Y will be defined as a vertical direction in FIG. 8A, and a direction X will be defined as a horizontal direction. A position 620 illustrates a position of center of gravity in a statically determinate state of the feature frame 609, and a position 621 illustrates a position of center of gravity when the feature frame 609 vibrates with an amount of vibration having a positive value in the direction Y. A position 622 illustrates a position of center of gravity when the feature frame 609 vibrates with an amount of vibration having a negative value in the direction Y.

Figure 8B:
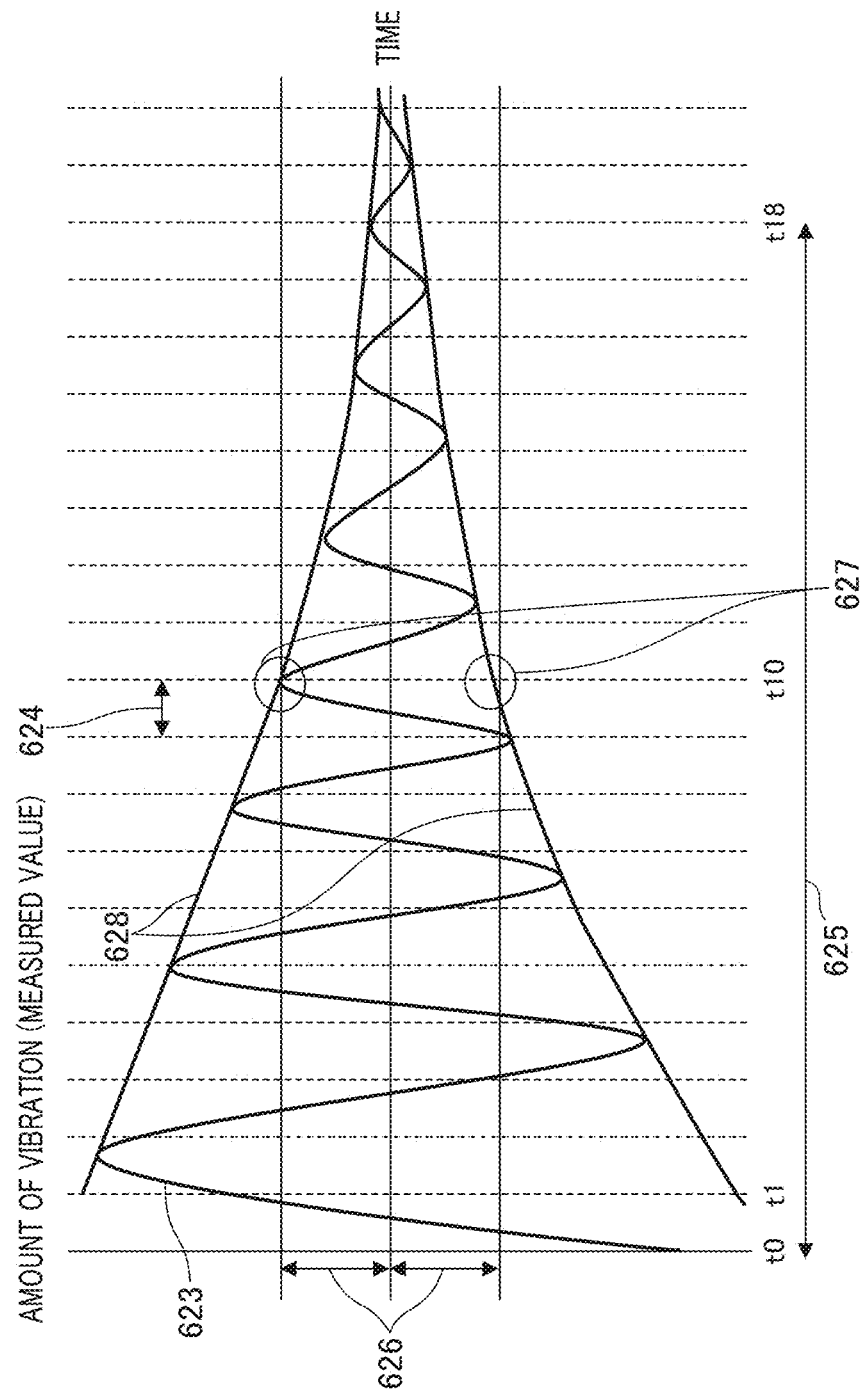

FIG. 8B is a graph illustrating change in the amount of vibration with respect to time as an example. The horizontal axis is a time axis, and the vertical axis represents a measured value of the amount of vibration. A graph curve 623 represents the amount of vibration of the feature frame 609 in accordance with the elapse of time. A time interval 624 is a measurement interval set in the spin box 616 illustrated in FIG. 6. A time 625 from a time t0 to a time t18 is a measurement time set in the spin box 617 illustrated in FIG. 6. A value 626 representing a predetermined amount of vibration is a threshold for determining a statically determinate state set in the spin box 618 illustrated in FIG. 6. The threshold is a predetermined amount of vibration used for determining that a target imaging device is in a statically determinate state and is represented in the number of pixels or an actual distance (for example, centimeters).

In the example illustrated in FIG. 8B, the image processing device 102 starts measurement of the amount of vibration from the time t0, measures the amount of vibration at measurement intervals represented as the time interval 624, and calculates time elapses of a maximum amount of vibration and a minimum amount of vibration. A graph line 628 is an envelope representing change in the amplitude of the graph curve 623 with respect to time. The image processing device 102 measures the amount of vibration at the measurement interval 624 from the time t0 to the time t18 in the measurement time. If an amplitude (measured value) represented by a graph line 628, which is calculated in this period, is not smaller than the threshold, it is determined that the imaging device is not in a statically determinate state. In the example illustrated in FIG. 8B, the amplitude of the amount of vibration is below the threshold 626 at the time t10, and accordingly, the image processing device 102 outputs a determination result representing that the imaging device is in a statically determinate state at the time t10.

When the setting processes of (A) to (C) end, and a user performs a clicking operation on an OK button 619 (FIG. 6), the image processing device 102 extracts reference features using the feature extracting method described above (FIG. 7: S706). The image processing device 102 performs a registration process of generating data of set items in a data format to be described later and storing the data after generation in the processed data storing area 406 as reference feature information (FIG. 7: S707).

FIGS. 9A and 9B are diagrams illustrating a data format of reference feature information. FIG. 9A illustrates an example of data generated for each imaging part. For example, in a first row in which the imaging part ID 801 is "01", the camera ID 802 is "01", an angle value of a panning direction 803 is "10.0" (unit: °), and an angle value of a tilt direction 804 is "−5.0" (unit: °). A zoom magnification 805 is "1.0" times, a feature extracting method 806 is "pattern matching", and a vibration amount calculating method 807 is "pattern position". A statically determinate determination setting 808 is "detailed", a determination level 809 is "Null", and a measurement interval 810 is "20" (times/sec). A measurement time (numerical value) 811 is "3", a measurement time (unit) 821 is "seconds", a threshold (numerical value) 822 is "1", and a threshold (unit) 823 is "millimeters". In a second row in which the imaging part ID 801 is "02", it is indicated that the statically determinate determination conditions are relaxed with respect to in the first row in which the imaging part ID 801 is "01". Items denoted by reference signs 801 to 811 and reference signs 821 to 823 have been described with reference to FIG. 6, and thus, description thereof will be omitted.

Data of the items indicated in each row illustrated in FIG. 9A is associated with reference feature information ID 812. The reference feature information ID 812 is an ID (identification information) used for uniquely identifying reference feature information. FIG. 9B illustrates an example of data generated for each piece of reference feature information. For example, the reference feature information ID 812 of the first row is "A". This ID "A" is associated with the imaging part ID "01" indicated in the first row illustrated in FIG. 9A. An X coordinate 813 in the first row represents an X coordinate "860" of the reference feature part, and a Y coordinate 814 represents a Y coordinate "520" of the reference feature part. A width 815 in the first row represents a width "80" of the reference feature part, and a height 816 represents a height "60" of the reference feature part. For example, if a pattern matching method is selected as the feature extracting method, image data of a pattern is recorded in the item of the feature quantity 817. Alternatively, if extraction of a position of center of gravity is selected as the feature extracting method, position coordinates of the center of gravity are recorded in the item of the feature quantity 817. A file name 818 is the name of an image file of the reference feature part. For example, a case in which a measurement result has not reached a satisfactory level when the system is tested after a user generates an image processing program 407 will be assumed. By displaying the registration processing screen 601 illustrated in FIG. 6 again, a user can perform an operation of changing a reference feature extracting method using the spin box 610 and an operation of changing details of a setting of the statically determinate determination condition using the control 612. At this time, by recording an image file of the reference feature part, there is no need to perform re-imaging of the reference feature part, and accordingly, efficiency of the work can be realized.

Figure 10:
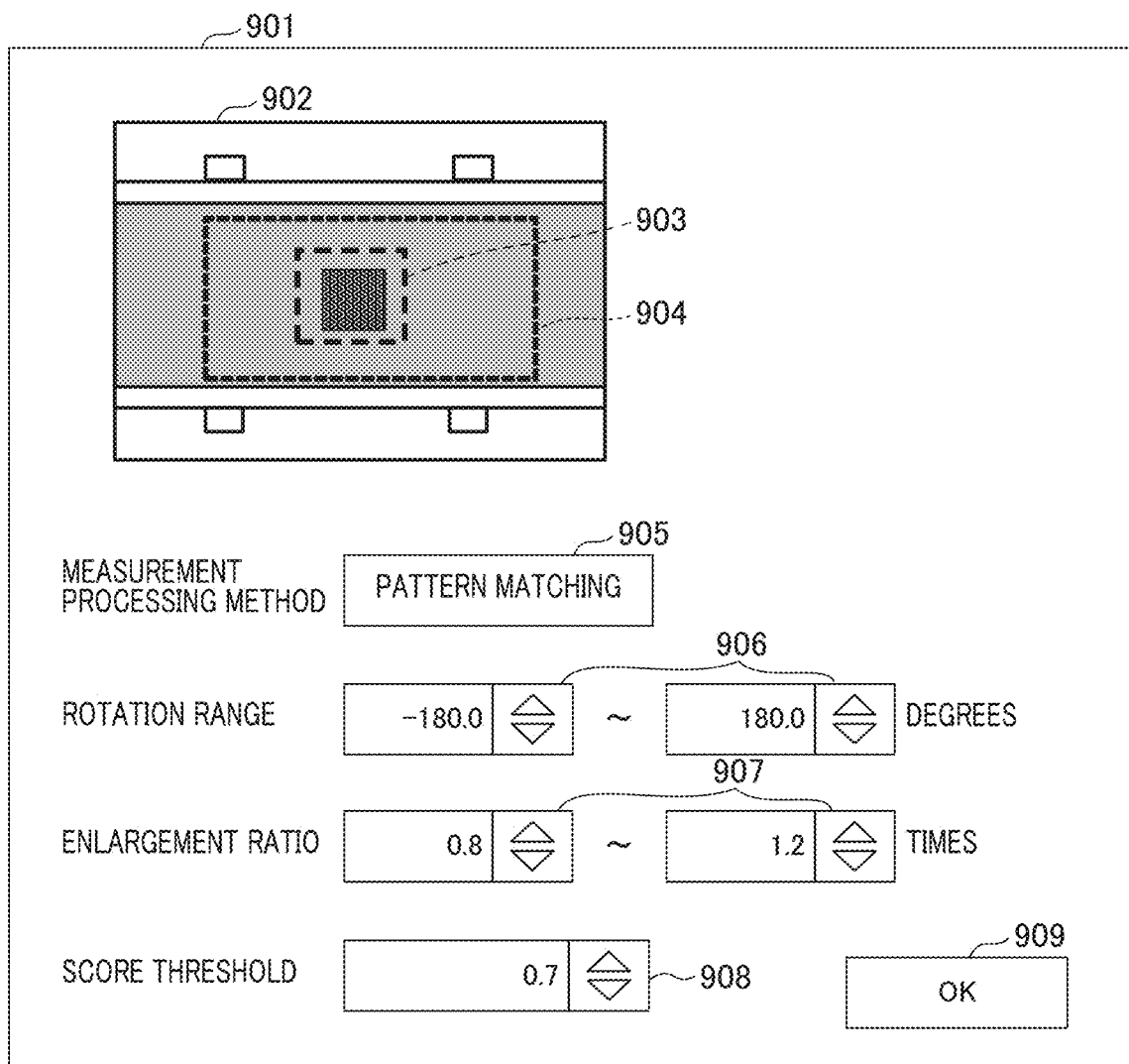
FIG. 10 is a diagram illustrating a setting screen of a measurement process according to the first example.

FIG. 10 is a diagram illustrating an example of a setting screen of a measurement process. If a user performs a double click operation on a process part illustrated in FIG. 5 (the workpiece position calculation 505, the presence detection 509, or the like), a setting screen 901 of the measurement process is displayed in the input/output display device 401.

An image indicated inside the image display area 902 illustrates an image captured by the imaging device 103. A frame 903 is a frame used if a user registers a measurement target, and a frame 904 is a frame used for a user to register a search range in the measurement. The frame 904 is set as a wider range including the frame 903. A user can change a shape, a position, and a size of a frame by operating the frame 903 or 904 using a pointing device such as a mouse.

In a display area 905 of the measurement processing method illustrated in FIG. 10, calculating the position of a workpiece using a pattern matching method is illustrated. In this example, although the pattern matching method is described as an example, a measurement processing method based on different image processing can be used. The spin boxes 906, 907, and 908 are respectively used when a rotation range, a magnification rate, and a score threshold of a pattern in the pattern matching method are set by a user.

When a user performs a clicking operation on an OK button 909, the image processing device 102 stores data of a measurement target indicated in the frame 903, a search range indicated in the frame 904, and a rotation range, a magnification rate, and a score threshold in the pattern matching method in the processed data storing area 406. In addition, if a feature extracting method set by the user using the spin box 610 illustrated in FIG. 6 is a method other than a pattern matching method, setting items according to the selected feature extracting method are displayed. In other words, the image processing device 102 executes a process of displaying a parameter setting user interface (UI) screen that is appropriate for the feature extracting method selected by the user instead of the items denoted by reference numerals 906 to 908.

As described with reference to FIG. 3A, regarding a reference image area, an area having little variation with the elapse of time and a large feature quantity is preferable. It is determined that, like an area in which a workpiece is shown, an area of which the position or the inclination changes with the elapse of time is not appropriate. Accordingly, if the reference image area and an image area that is a measurement target overlap each other when the reference image area represented in the frame 609 illustrated in FIG. 6 is set and when the measurement target is registered using the frame 903 illustrated in FIG. 10, the image processing device 102 performs a process of warning a user.

Figure 11:
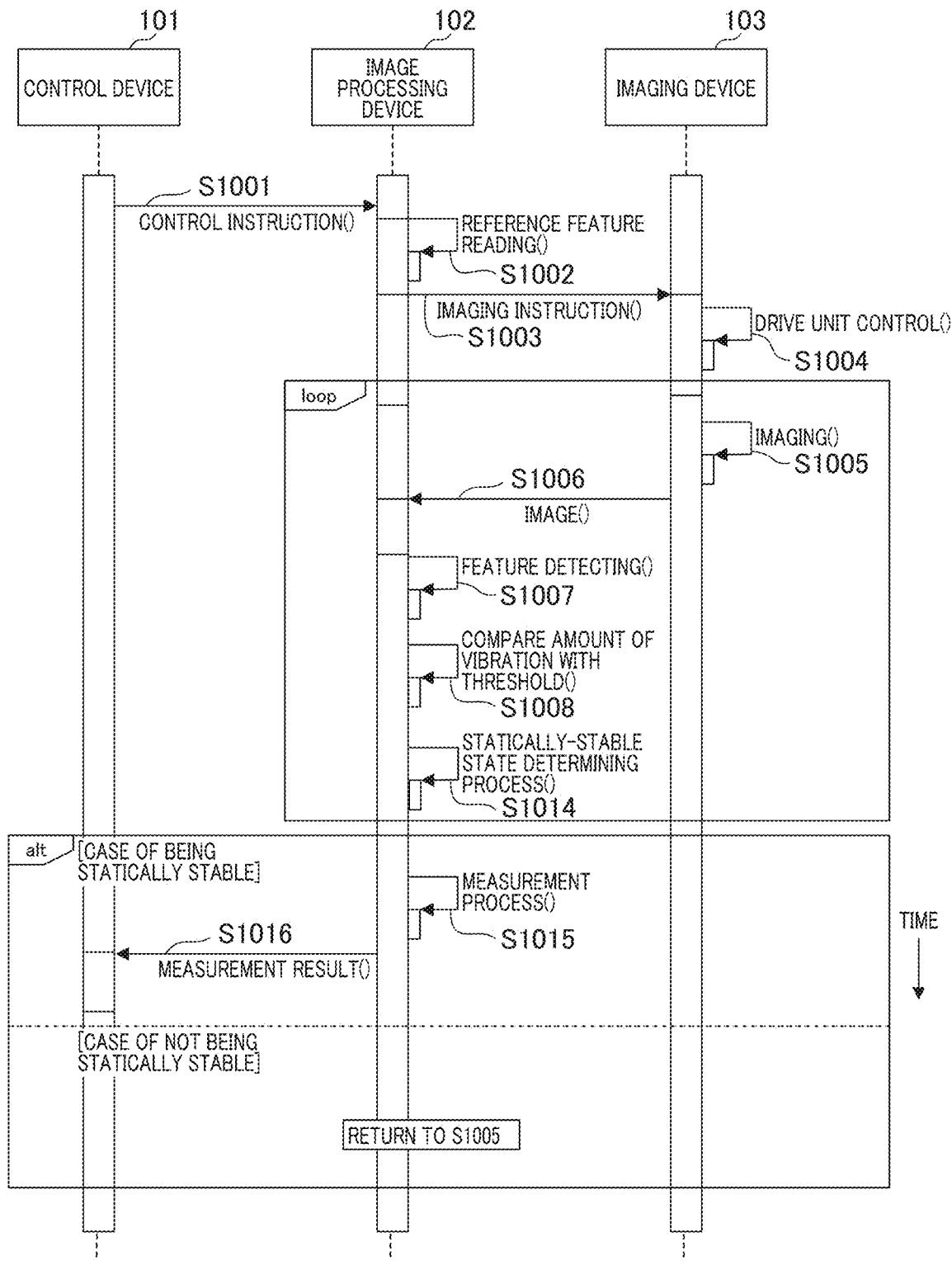
FIG. 11 is a sequence diagram of a measurement process according to the first example.

FIG. 11 is a sequence diagram when the image processing device 102 accepts a trigger signal from the control device 101 and executes an image measuring process. In FIG. 11, processes executed by the control device 101 are added, and one example of processes performed among the control device 101, the image processing device 102, and the imaging device 103 is illustrated. A direction of the time axis is defined as a direction from the upper side to the lower side in FIG. 11.

First, the control device 101 transmits a control instruction to the image processing device 102 (S1001). The image processing device 102 reads reference feature information (FIG. 9A: 802 to 816 and 821 to 823) from the processed data storing area 406 (S1002). Next, the image processing device 102 transmits an imaging instruction of the panning direction, the tilting direction, and the zoom magnification (FIG. 9A: 803 to 805) relating to an imaging position to the imaging device 103 (S1003). The imaging device 103 changes the panning angle, the tilting angle, and the zoom magnification by controlling the drive unit (S1004). An imaging operation is performed (S1005), and thereafter, the imaging device 103 transmits data of a captured image to the image processing device 102 (S1006).

The image processing device 102 executes a process of extracting feature parts from the received image data in accordance with the feature extracting method and the vibration amount calculating method designated in the spin boxes 610 and 611 illustrated in FIG. 6 (S1007). The image processing device 102 calculates the amount of vibration of a feature part from images that are adjacent to each other in a time series captured at measurement times designated in the spin box 617 illustrated in FIG. 6. The amount of vibration is calculated from at least one calculation parameter such as center coordinates of the extracted feature part. The image processing device 102 compares the calculated amount of vibration with a threshold designated in the spin box 618 illustrated in FIG. 6 (S1008). If a result of the comparison process is that the amplitude of the amount of vibration is smaller than the threshold, the image processing device 102 determines that the imaging device 103 is in a statically determinate state. On the other hand, if the amount of vibration is equal to or larger than the threshold, it is determined that the imaging device 103 is not in the statically determinate state (S1014). The processes of S1005 to S1008 and S1014 are repeatedly executed at a measurement interval designated in the spin box 616 illustrated in FIG. 6 in advance.

If a determination result indicating that the imaging device 103 is in the statically determinate state is acquired in S1014, processes of S1015 and S1016 are executed. The image processing device 102 performs a predetermined measurement based on image processing (S1015) and transmits data of the measurement result to the control device 101 (S1016).

On the other hand, if a determination result indicating that the imaging device 103 is not in the statically determinate state is acquired in S1014, the image processing device 102 determines whether or not the measurement time designated in the spin box 617 illustrated in FIG. 6 has elapsed. If the designated measurement time has not elapsed, the processes of S1005 to S1008 and S1014 are repeatedly executed. On the other hand, if the designated measurement time has elapsed, the image processing device 102 determines that the imaging device 103 has not reached the statically determinate state within the measurement time and ends the process. Alternatively, the image processing device 102 may perform a process of notifying that the imaging device 103 has not reached the statically determinate state within the measurement time and then end the process.

This example, for example, is also compatible with a case in which the accuracy of the statically determinate capability of the imaging device is insufficient relative to desired measurement accuracy in image processing due to a method of fixing the imaging device or insufficient statically determinate capability. Since a setting of determination of a statically determinate state can be changed in accordance with image processing and a type of workpiece, it can be determined that the imaging device is in a statically determinate state that is necessary and sufficient, and imaging and image measurement can be performed in a necessary minimum time.

In addition, by using image processing for the determination of the statically determinate state, the image processing can be performed while measurement accuracy is secured also using an inexpensive camera. For example, in the process of sorting workpieces according to different types of workpiece on the basis of captured images of the workpieces and loading the workpieces into different conveying vehicles using the robot, more stringent determination conditions can be set by increasing the determination level for a statically determinate state. In accordance with this setting, the robot can be accurately controlled by increasing the measurement accuracy of the image processing. On the other hand, in the process of imaging a conveying vehicle using the imaging device and determining whether or not the conveying vehicle is present within a stop frame, the determination condition can be relaxed by setting the level of determination of statically determinate to be low. In accordance with this setting, required measurement can be completed in a short time while the measurement accuracy required for the process is satisfied. According to this example, by performing determination of statically determinate of an imaging device with the measurement accuracy that is necessary and sufficient for image processing in accordance with a designated statically determinate determination condition, a measurement process can be performed in a shorter time.

Second Example

Next, a second example of the present invention will be described. While a reference image area needs to be designated by a user operation in the first example, an image processing device that can automatically or semi-automatically determine a reference image area will be described in this example. Even a user who has little knowledge of an image feature can set a preferable reference image area, and accordingly, dependency on individuals at the time of setting can be reduced. A system configuration according to this example is similar to that according to the first example, and thus, detailed description thereof will be omitted when using the reference signs that have already been used. Such omission of description is the same in the examples to be described later.

Figure 12:
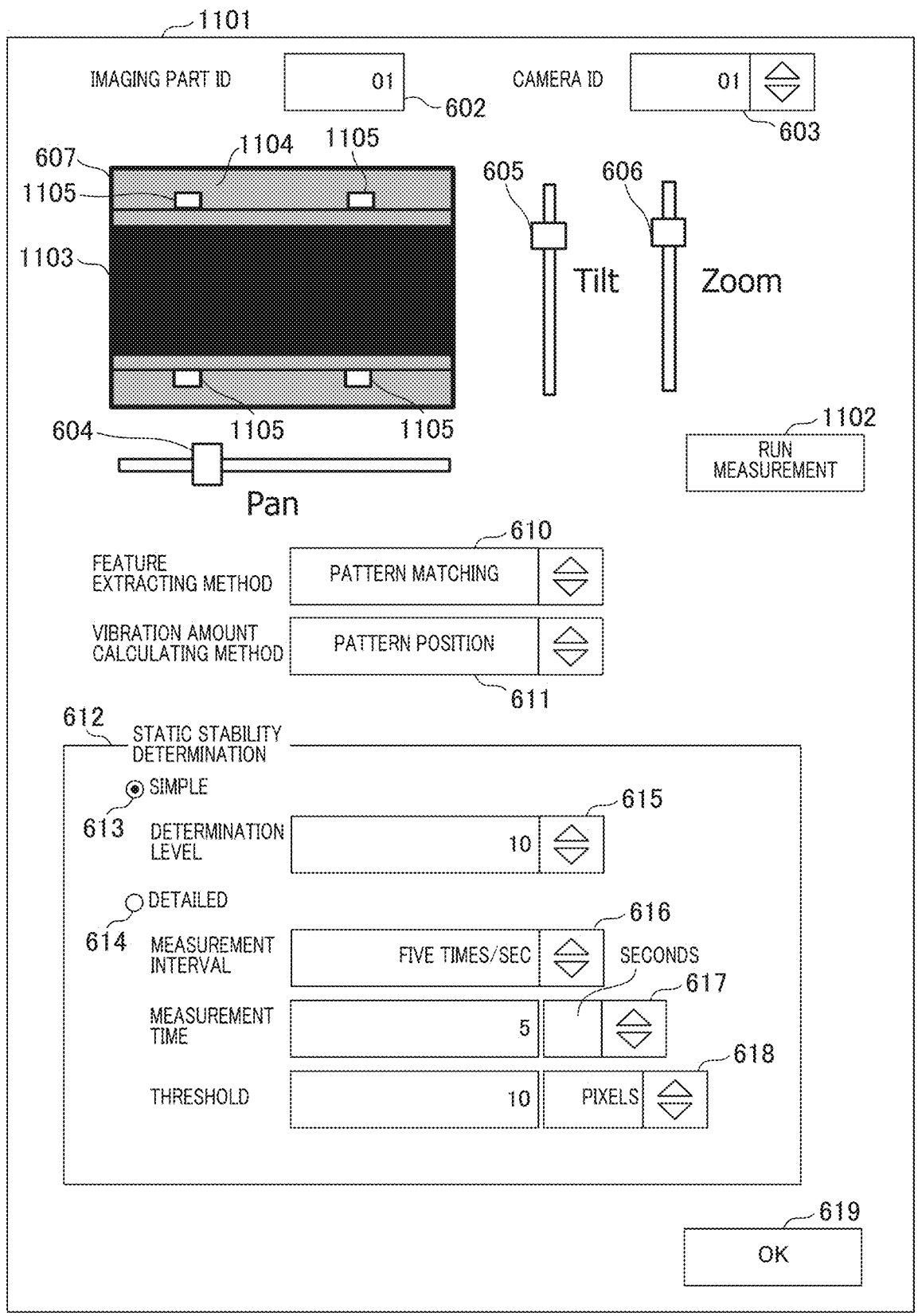
FIG. 12 is a diagram illustrating a reference feature registration processing screen according to a second example.
Figure 13:
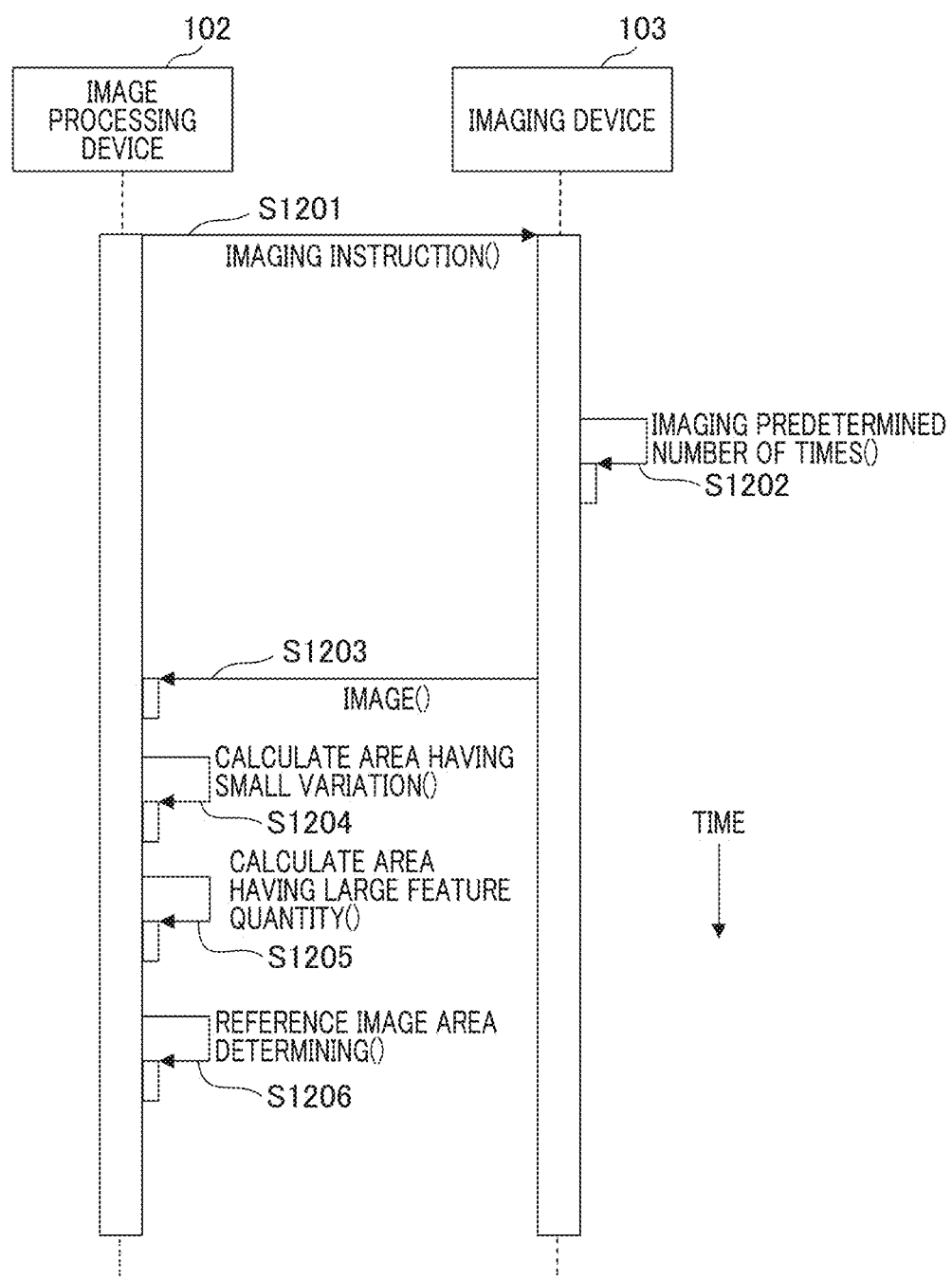
FIG. 13 is a sequence diagram of a reference feature registration process according to the second example.

FIG. 12 illustrates an example of a reference feature registration processing screen in an image processing device 102 of this example. FIG. 13 is a sequence diagram of a reference feature registering process. Hereinafter, points different from those of the first example will be mainly described. On a registration screen 1101 illustrated in FIG. 12, a button 1102 of running measurement is added. A user can instruct running of measurement be performed a plurality of number of times by operating the button 1102.

The user operates bars 604 to 606 while looking at the reference feature registration screen 1101. The image processing device 102 controls an imaging direction by performing driving control of a camera platform 201 of an imaging device 103. A captured image that is captured by the imaging device 103 is displayed in an image display area 607. Here, when a user performs a clicking operation on a button 1102, the image processing device 102 transmits an imaging instruction to the imaging device 103 (FIG. 13: S1201). The imaging device 103 performs imaging a predetermined number of times (S1202) and transmits data of all the images to the image processing device 102 (S1203).

The image processing device 102 calculates an area having little variation from the image data received from the imaging device 103 (S1204) and displays an area 1103 having a large variation in black. Next, the image processing device 102 calculates an area having a large feature quantity in an area having little variation. Here, an area having a large feature quantity, for example, is an area in which the contrast is clear. The image processing device 102 displays an area 1104 having a small feature quantity in gray in the image display area 607 (S1205). Then, the image processing device 102 determines an area 1105 having a large feature quantity as a reference image area (S1206).

In this embodiment, for example, an image area having a smallest variation in an image area acquired through measurement performed over a plurality of number of times is automatically set as a reference image area. Alternatively, an area having a largest feature quantity in an area having little variation may be automatically set as a reference image area with high priority by the image processing device 102. Instead of such an automatic process, a semi-automatic process in which one or a plurality of areas having little variation and a large feature quantity are presented to a user as candidates for a reference image area, and the user performs a selection operation may be performed. In such a case, a process of prompting the user to select a reference image area is performed. Candidates for an area 1105 having little variation and a large feature quantity, for example, may be presented to a user in white display in the image display area 607, and the user can designate a desired area as the reference image area.

In this example, even a user having little knowledge about an image feature can set a preferable reference image area. In addition, dependency on individuals at the time of setting is reduced, and a process that is not easily influenced by the degree of individual skill can be performed.

Third Example

Next, a third example of the present invention will be described. In the first example, the amount of vibration of the imaging device 103 is measured at the measurement interval 624 illustrated in FIG. 8B, and an amplitude represented using a graph line 628 representing elapse of time thereof is calculated. The image processing device 102 performs measurement at the measurement interval 624 until a certain time point in the measurement time 625 and determines that the imaging device 103 is in a statically determinate state at a time point at which the amplitude of the amount of vibration becomes smaller than a threshold.

Figure 14:
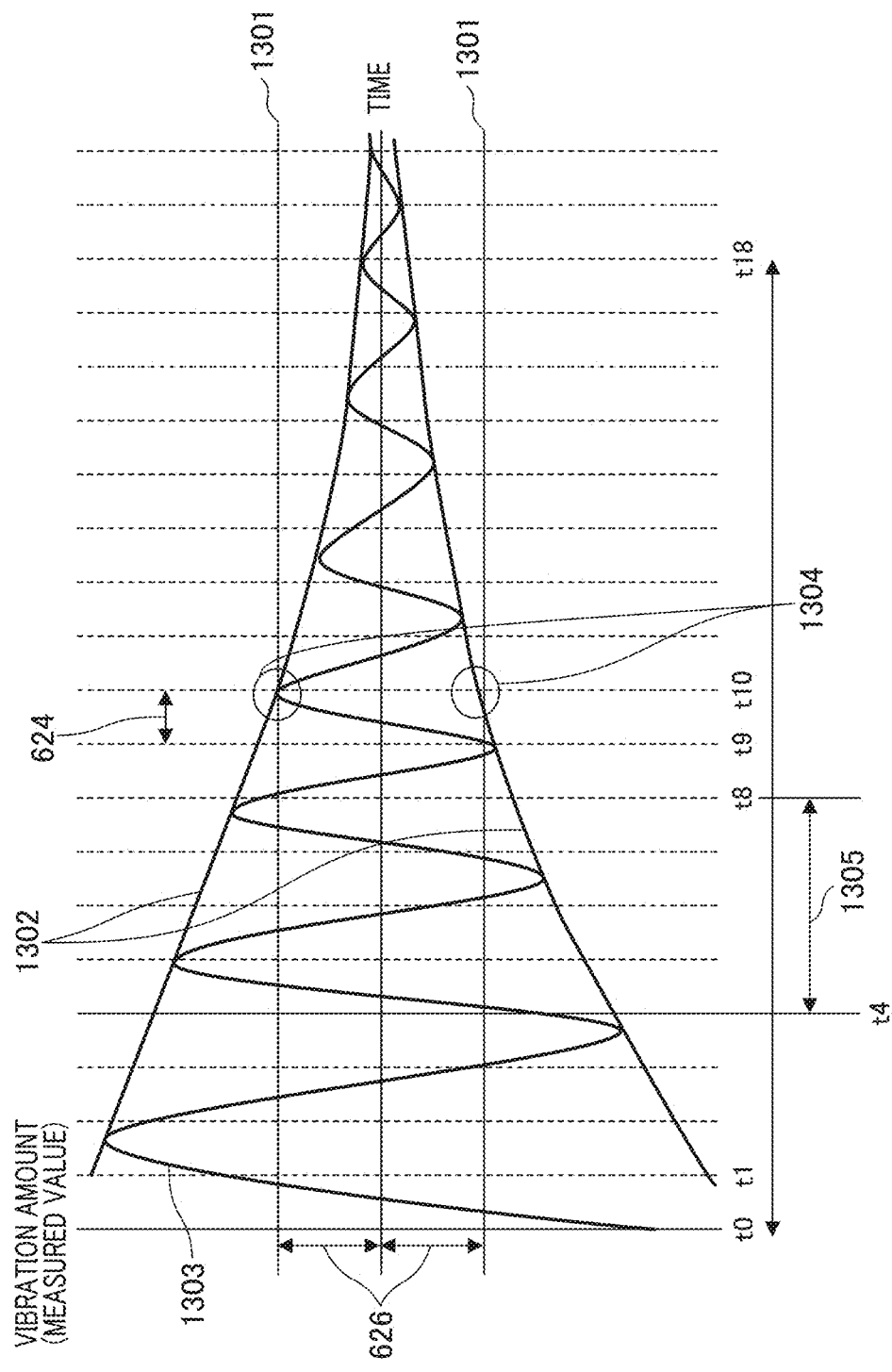
FIG. 14 is a diagram illustrating an estimation process using past measurement values according to a third example.

In this example, a process of estimating a time in which an imaging device comes into a statically determinate state will be described using the imaging device of which the statically determinate state was determined in the past and a measured value of the amount of vibration in the installed state. FIG. 14 is a graph illustrating changes in the amount of vibration with respect to time as an example, and settings of the vertical axis and the horizontal axis are the same as those of FIG. 8B. FIG. 14 illustrates an estimated value 1303 of the amount of vibration of a reference feature part in accordance with the elapse of time in an imaging device of which a statically determinate state was determined in the past. The image processing device 102 performs measurement at the set measurement interval 624. The image processing device 102 calculates a time t10 at which a target imaging device is determined as being in the statically determinate state on the basis of the amount of vibration at a measurement start time t4, a statically determinate estimation curve 1302, and a set threshold 1301. The statically determinate estimation curve 1302 is an envelope of an estimated value 1303 of the amount of vibration, and an estimation process of calculating a position 1304 at which the statically determinate estimation curve 1302 intersects with a line of the threshold 1301 is performed.

The image processing device 102 restarts a process of comparing the threshold with the amplitude of the amount of vibration at a time t9 that is immediately before the time t10 at which the imaging device is estimated to come into the statically determinate state or a further previous time t8. In other words, the image processing device 102 does not perform a process of comparing the amplitude of the amount of vibration with the threshold in a time 1305 that is from the measurement start time t4 to the measurement restart time t8. In this way, an arithmetic operation resources used by the image processing device 102 can be secured, or a process according to another task can be performed.

The image processing device 102 calculates a curve approximating a statically determinate estimation curve representing changes in the amplitude of the amount of vibration relating to a target imaging device with respect to time on the basis of measured values measured in the past. Alternatively, if a user can select a method of calculating a statically determinate estimation curve, the image processing device 102 performs a process of presenting calculation methods and selecting a calculation method, and a calculating means is arbitrary. In this example, by estimating a time at which the imaging device comes into the statically determinate state on the basis of values measured in the past, a load applied to a process of comparing the amplitude of an actual amount of vibration with the threshold can be reduced.

Fourth Example

The overall configuration diagram of a system and configurations of an image processing device 102, and an imaging device 103 according to a fourth example are similar to those illustrated in FIGS. 1, 2, and 4 described in the first example. In addition, in the fourth example, a flowchart generating screen used for generating an image processing program 407 is similar to that illustrated in FIG. 5 described in the first example. For this reason, duplicate description thereof will be omitted.

Here, the process of the image processing device 102 according to the fourth example will be described with reference to FIGS. 3A and 3B.

An image 301 illustrated in FIG. 3A is an image acquired by the imaging device 103 by imaging a workpiece 108 on a conveying device 105. The image processing device 102 processes data of the image 301 and calculates actual spatial coordinates of the workpiece 108. The control device 101 controls the robot 104 on the basis of a result of the image processing. At this time, when the position reproducibility of the imaging device 103 decreases, an error between the coordinates of the position/posture of the workpiece 108 calculated by the image processing device 102 and actual coordinates of the position/posture of the workpiece 108 occurs. If the error exceeds an allowed range, there is a possibility that an error occurs in the control of the robot 104, and a problem is caused in a gripping or picking-up operation for the workpiece 108.

Thus, the image processing device 102 performs imaging of a reference image area after changing an imaging position of the imaging device 103 and determines whether or not position reproducibility is secured. While a reference image area will be described later, for example, like an area 302 in which a bolt or a pillar fixing the conveying device 105 is shown, an area having little variation according to elapse of time and a large feature quantity is appropriate as the reference image area. In contrast to this, like an area in which the workpiece 108 and surrounding parts thereof are shown, an area in which a position or an inclination changes in accordance with the elapse of time in a moving image is not appropriate as a reference image area.

The imaging device 103 transmits data of the image 301 including the reference image area 302 to the image processing device 102. Alternatively, the imaging device 103 may transmit image data acquired by trimming the reference image area 302 to the image processing device 102. Alternatively, the imaging device 103 may extract features to be described later by performing image processing of the image 301 and transmit only data representing a result of the extraction to the image processing device 102.

An image 303 illustrated in FIG. 3B is an image acquired by imaging the conveying vehicle 106 using the imaging device 103. The image processing device 102 performs image processing of the image 303 and determines whether or not the conveying vehicle 106 is present within the stop frame 111. At this time, determination accuracy of the position reproducibility required for the imaging device is assumed to be lower than that of the measurement situation A112. Rather, in a case in which excessive position reproducibility is required, an event in which a measurement time becomes long if a correction process more than necessary is performed occurs.

Figure 15:
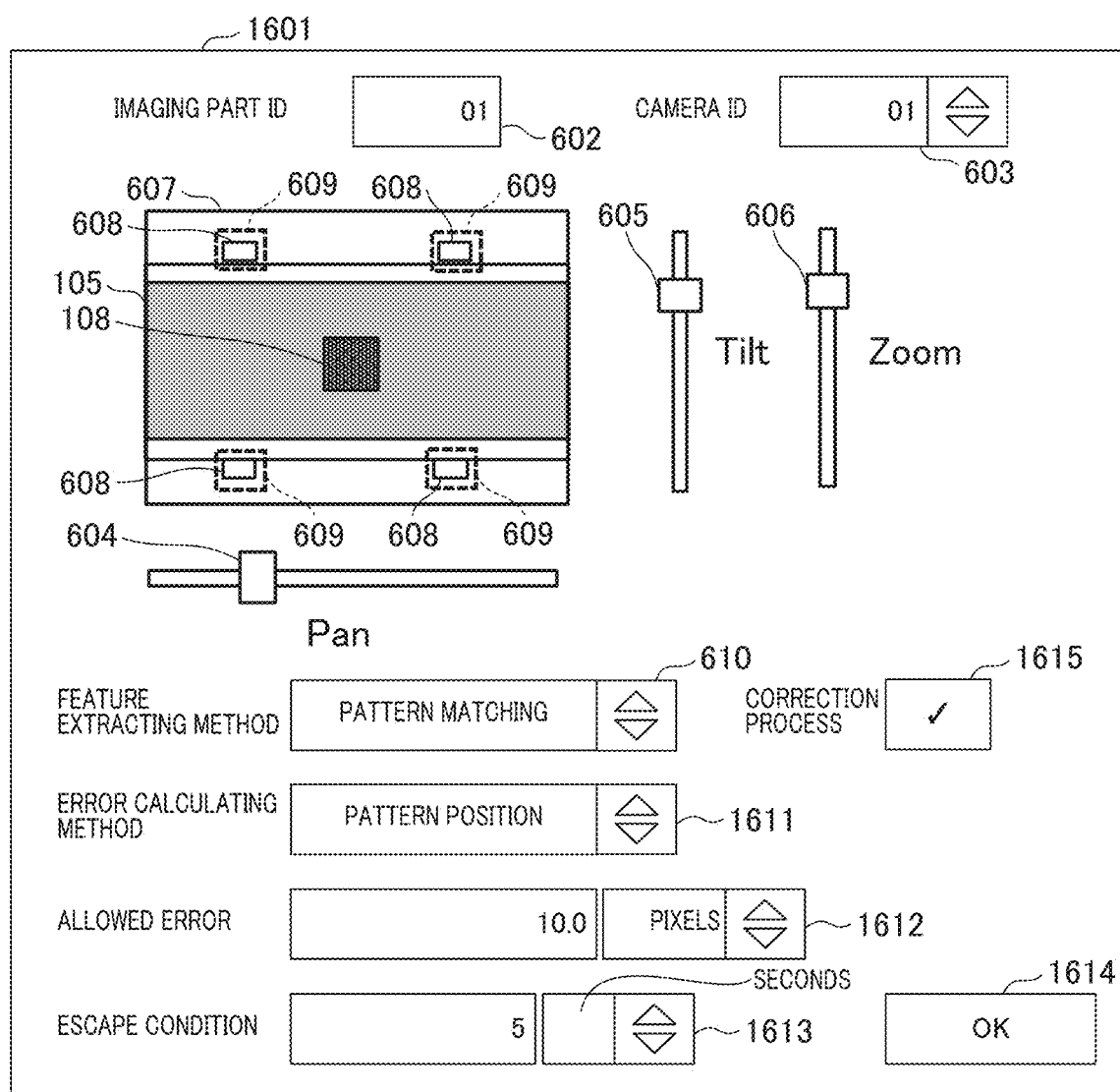
FIG. 15 is a diagram illustrating a reference feature registration processing screen according to a fourth example.

FIG. 15 is a diagram illustrating a reference feature registration processing screen in an imaging process of the fourth example. For example, in the flowchart 503 illustrated in FIG. 5, if a user performs a double click operation for a processing part of the imaging process 504 or 508, a registration processing screen 1601 is displayed by the input/output display device 401. The user can perform setting registration of a reference feature part used as a reference at the time of measurement while looking at the registration processing screen 1601.

A sequence diagram of a reference feature registration process according to the fourth example is similar to that illustrated in FIG. 7. Hereinafter, a registration process configured from the following processes (A) to (D) will be specifically described with reference to FIGS. 15 and 7.

(A) Setting process of imaging device to be used (B) Setting process of panning, tilting, and zoom magnification relating to imaging position (C) Process of setting a reference image area, features to be extracted, and an error calculating method for evaluating position reproducibility originated from performance and degradation of a drive mechanism unit included in the imaging device. In the drive mechanism unit, a panning mechanism, a tilt mechanism, and a zooming mechanism are included.

(D) Process of setting allowed error and an escape condition for each measurement situation The processes (A) and (B) included in the registration process described above are similar to those according to the first example, and duplicate description will be omitted, and the processes (C) and (D) will be described here.

The object of the process (C) is for detecting reproducibility of an imaging position relating to the imaging device 103 using a predetermined image processing. Each frame 609 denoted by dotted lines inside an image display area 607 illustrated in FIG. 15 is a frame used for a user to register a reference image area. A user can change a shape, a position, a size, and the like of the frame 609 using the operation input device 402. In FIG. 15, an image area of each bolt part 608 fixing the conveying device 105 is surrounded by a frame 609, and an area within four frames 609 is designated as a reference image area. In S705 illustrated in FIG. 7, a determination process of determining a reference image area is illustrated. The frames 609 may be added or deleted. For example, when a user performs a right-side clicking operation of a mouse, a context menu (not illustrated in the drawing) is displayed, and, when the user selects "addition/deletion of a frame", an operation of adding or deleting a frame can be performed.

In a middle part of the registration processing screen 601 illustrated in FIG. 15, two spin boxes 610 and 1611 are illustrated. The spin box 610 is similar to the spin box 610 according to the first example illustrated in FIG. 6.

The spin box 1611 is used when a method of calculating error is selected. A method of calculating error based on a reference feature and a feature (similar to the reference feature, a position and a phase of a pattern, an edge, a gradation value, an area and a position of a binarized area, a size, a position and an inclination of a rectangle, a length, a color density value, and the like) extracted at the time of measurement to be described later can be selected. In the method of calculating error, for the reference feature and each of extracted features, a degree of matching between patterns, a difference between the positions of centers of gravity of edges or areas, a difference between sizes of rectangles, differences between distances and inclinations of position coordinates, a difference between the lengths, a difference between gradations, a positional relation among a plurality of features, or the like can be selected. In this case, it may be configured such that a combination of two or more calculation methods can be set.

Next, the process (D) will be described. As described with reference to FIG. 3A, measurement accuracy and a recognition rate that are required are different in accordance with a measurement situation. In this case, a user can input allowed error in each image processing process using the spin box 1612 when designating determination conditions of reproducibility of the imaging position. The allowed error represents an allowed degree of error according to the influence of reproducibility at the time of image measurement. The allowed error, for example, is represented using the number of pixels (in units of pixels) or an actual distance (in units of centimeters). In this example, a form in which allowed error is directly designated by a user using the spin box 1612 on the basis of the amount of measurement error required for a target image measuring process will be described. As another embodiment, as described above, there is a form in which the amount of error in image measurement is estimated from a measurement error range required for an image measuring process, device information of the imaging device used in the system, and the like, and a recommended value is calculated and presented through calculation of a difference.

The spin box 1613 is used when a user designates an escape condition. The escape condition is a condition that is used for stopping correction for an imaging position with respect to the imaging device 103 and, for example, can be designated using the number of times of correction or a correction limit time (in units of seconds). If measurement error at the time of measurement exceed the allowed error, the image processing device 102 transmits a correction instruction to the imaging device 103. At that time, a process of transmitting a correction instruction at the number of times of correction or the limit time designated using the spin box 1613 is executed. The check box 1615 is used when it is selected whether or not a correction process is executed. If a check mark is applied to the check box 1615, a correction process on a measurement situation is executed. In addition, by leaving out a check mark in the check box 1615, it can be set such that a correction process is not executed on a measurement situation.

When the processes (A) to (D) described above end, and a user performs a clicking operation for an OK button 1614, the image processing device 102 extracts a reference feature using a designated feature extracting method (FIG. 7: S706). Then, a process of generating data of set items in a data format illustrated in FIGS. 16A and 16B is performed, and the data is stored in the processed data storing area 406 as reference feature information (FIG. 7: S707).

FIGS. 16A and 16B are diagrams illustrating a data format of reference feature information according to the fourth example. FIG. 16A illustrates an example of data generated for each imaging part. For example, in a first row in which the imaging part ID 1801 is "01", the camera ID 1802 is "01", an angle value of a panning direction 1803 is "10.0" (unit: °), and an angle value of a tilting direction 1804 is "−5.0" (unit: °). A zoom magnification 1805 is "1.0" times, a feature extracting method 1806 is "pattern matching", and an error calculating method 1807 is "pattern position". An escape condition (numerical value) 1808 is "5", and an escape condition (unit) 1809 is "times". Allowed error (numerical value) 1810 is "5", and allowed error (unit) 1811 is "pixel". In a second row in which the imaging part ID 1801 is "02", it is represented that determination conditions for reproducibility are relaxed with respect to that in the first row in which the imaging part ID 1801 is "01". Items denoted by reference signs 1801 to 1811 have been described with reference to FIG. 15, and thus description thereof will be omitted.

Data of the items indicated in each row illustrated in FIG. 16A is associated with reference feature information ID 1812. The reference feature information ID 1812 is an ID (identification information) used for uniquely identifying reference feature information. FIG. 16B illustrates an example of data generated for each piece of reference feature information. For example, the reference feature information ID 1812 of the first row is "A". This ID "A" is associated with the imaging part ID "01" indicated in the first row illustrated in FIG. 16A. An X coordinate 1813 in the first row represents an X coordinate "860" of the reference feature part, and a Y coordinate 1814 represents a Y coordinate "520" of the reference feature part. A width 1815 in the first row represents a width "80" of the reference feature part, and a height 1816 represents a height "60" of the reference feature part. For example, if a pattern matching method is selected as the feature extracting method, image data of a pattern is recorded in the item of the feature quantity 1817. Alternatively, if extraction of a position of center of gravity is selected as the feature extracting method, position coordinates of the center of gravity are recorded in the item of the feature quantity 1817. A file name 1818 is the name of an image file of the reference feature part. For example, a case in which a measurement result has not reached a satisfactory level when the system is tested after a user generates an image processing program 407 will be assumed. By displaying the registration processing screen 1601 illustrated in FIG. 15 again, a user can perform an operation of changing a reference feature extracting method using the spin box 610 and an operation of changing the error calculating method using the spin box 1611. At this time, by recording an image file of the reference feature part, there is no need to perform re-imaging of the reference feature part, and accordingly, the efficiency of the work can be realized.

A setting screen of a measurement process according to the fourth example is similar to that illustrated in FIG. 10, and duplicate description will be omitted.

FIG. 17 is a sequence diagram when a trigger signal from the control device 101 is accepted, and the image processing device 102 executes an image measuring process. In FIG. 17, a process executed by the control device 101 is added, and one example of a process performed among the control device 101, the image processing device 102, and the imaging device 103 is illustrated. The direction of a time axis is defined as a direction from the upper side to the lower side in FIG. 17.

First, the control device 101 transmits a control instruction to the image processing device 102 (S2001). The image processing device 102 reads reference feature information (FIG. 16A: 1802 to 1818) from the processed data storing area 406 (S2002). Next, the image processing device 102 transmits an imaging instruction of the panning direction, the tilting direction, and the zoom magnification (FIG. 16A: 1803 to 1805) relating to an imaging position to the imaging device 103 (S2003). The imaging device 103 changes the panning angle, the tilting angle, and the zoom magnification by controlling the drive unit (S2004). An imaging operation is performed (S2005), and thereafter, the imaging device 103 transmits data of a captured image to the image processing device 102 (S2006).

The image processing device 102 extracts feature parts from the received image data in accordance with the feature extracting method and the error calculating method designated in the spin boxes 610 and 1611 illustrated in FIG. 15 (S2007). Then, the image processing device 102 calculates error in at least one of the coordinates, the size, and the inclination of the extracted feature part. The calculation of error is performed by comparison with the X coordinate 1813, the Y coordinate 1814, the width 1815, and the height 1816 of the reference feature information (S2008). Here, error between the extracted feature part and the reference feature part is one example of an evaluation value.

If the calculated error is larger than the designated allowed error in S2008, the image processing device 102 calculates correction values of the panning angle, the tilting angle, and the zoom magnification on the basis of deviations between the extracted feature part and the reference feature part (S2009). A correction process will be described later with reference to FIGS. 18A to 18E. Next, the image processing device 102 transmits a correction instruction for the panning angle, the tilting angle, and the zoom magnification to the imaging device 103 (S2010). The imaging device 103 performs change of the panning angle and the tilting angle and change of the zoom magnification by controlling the drive unit (S2011). An imaging operation is performed (S2012), and the imaging device 103 transmits captured image data to the image processing device 102 (S2013). The image processing device 102 performs a comparison process similar to that of S2008 and determines whether or not the calculated error is within the designated allowed error (equal to or smaller than a threshold) (S2014). As a result, if the error is equal to or smaller than the threshold, a predetermined measurement process is performed (S2015), and the image processing device 102 transmits data of a result of the measurement to the control device 101 (S2016).

In addition, if it is determined that the error is within the designated allowed error (equal to or smaller than the threshold) as a result of the comparison process in S2008, a predetermined measurement process is performed using parameters designated on the setting screen 901 by a user (S2015). The image processing device 102 transmits the data of the measurement result to the control device 101 (S2016).

The processes illustrated in S2009 to S2014 illustrated in FIG. 17 are executed until the escape condition designated by the user in the spin box 1613 illustrated in FIG. 15 is satisfied. After a correction process of a predetermined number of times or a predetermined time is performed, if the calculated error is larger than the allowed error, the image processing device 102 regards that target measurement accuracy cannot be secured and transmits a signal indicating that reproducibility cannot be secured to the control device 101. In addition, the image processing device 102 outputs an image signal to the input/output display device 401 and executes a process of displaying a display screen indicating that reproducibility of an imaging position cannot be secured and notifying a user thereof.

By using the correction information calculated in S2009, each piece of information of the panning direction 1803, the tilting direction 1804, and the zoom magnification 1805 that is reference feature information described with reference to FIG. 16A may be overwritten and be stored in the processed data storing area 406. Each piece of the information may be used for measurement of the next time or any subsequent time. Alternatively, the image processing device 102 stores history data of the correction information calculated in S2009 in the processed data storing area 406. The image processing device 102 performs control of calculating a correction value in S2009 of the next time or a subsequent time on the basis of correction information for a plurality of number of times using the stored history data of correction values and updating the set value of the imaging position.

The processes of S2008 to S2010 illustrated in FIG. 17 will be described more specifically with reference to FIGS. 18A to 18E. An image example 2101 illustrated in FIG. 18A schematically illustrates reference feature parts of an image registered by the image processing device 102 at the time of registering reference features described with reference to FIG. 15. A plurality of reference feature parts 2102 are represented by a frame having a rectangular shape, and these correspond to an image part inside the frame 609 illustrated in FIG. 15. Dotted lines 2103 represent positional relations among the plurality of reference feature parts 2102. The reference feature parts 2102 are positioned at vertexes of a rectangle represented by the four dotted lines 2103.

An image example 2104 illustrated in FIG. 18B schematically illustrates features of an image received by the image processing device 102 at the time of measurement in S2006 illustrated in FIG. 17. A plurality of feature parts 2105 are represented by a frame having a rectangular shape extracted in S2007 illustrated in FIG. 17. Dotted lines 2114 represent positional relations among the plurality of feature parts 2105. The feature parts 2105 are positioned at vertexes of a rectangle represented by the four dotted lines 2114. In S2008 illustrated in FIG. 17, a process of comparing positions of the reference feature parts 2102 and the feature parts 2105 in the image and determining whether or not an error has occurred is performed. If an error has occurred and exceeds an allowed error, correction values are calculated in S2009. For example, errors in an X axis and a Y axis between the reference feature parts 2102 and the feature parts 2105 in the image will be respectively denoted by $\Delta x$ and $\Delta y$. A correction value in a direction P will be denoted by $\Delta P$, and a correction value in a direction T will be noted by $\Delta T$. The image processing device 102 calculates each correction value using the following Equation (1).

$$\Delta P = Fp(\Delta x)$$

$$\Delta T = Ft(\Delta y) \qquad (1)$$

Fp( ) represented in Equation (1) is a correction function for the direction P based on $\Delta x$, and Ft( ) is a correction function for the direction T based on $\Delta y$. Proportional control may be performed by using a proportional function as a correction function. Alternatively, the process of calculating Fp( ) and Ft( ) may be performed using a reference table associating $\Delta P$ and $\Delta x$ and $\Delta T$ and $\Delta y$.

The image processing device 102 corrects the panning angle P recorded in the panning direction 1803 illustrated in FIG. 16A and the tilting angle T recorded in the tilting direction 1804. The panning angle and the tilting angle after correction are respectively P+ΔP and T+ΔT. The image processing device 102 transmits a correction instruction based on P+ΔP and T+ΔT to the imaging device 103 in S2010 illustrated in FIG. 17.

FIG. 18C illustrates an image example 2106 if the reproducibility of zoom magnification decreases. As a plurality of feature parts 2107, feature parts of an image received by the image processing device 102 in S2006 illustrated in FIG. 17 are represented by a frame having a rectangular shape. Dotted lines 2108 represent positional relations among the plurality of feature parts 2107. The feature parts 2107 are positioned at vertexes of a rectangle represented by the four dotted lines 2108. There are cases in which errors occur in size of the feature part and distance between the reference feature parts 2102 illustrated in FIG. 18A and the feature parts 2107 of the image received by the image processing device 102 in S2006. In such cases, the image processing device 102 performs correction of the zoom magnification. Here, the size of each reference feature part 2102 will be denoted by $S_1$, and the size of each feature part 2107 will be denoted by $S_2$. The image processing device 102 calculates a ratio $S_2/S_1$ on the basis of $S_2$ and $S_1$ and performs correction of the zoom magnification.

Alternatively, the image processing device 102 compares a distance between the reference feature parts 2102 adjacent to each other illustrated in FIG. 18A with a distance between the feature parts 2107 adjacent to each other illustrated in FIG. 18C and performs correction of the zoom magnification. Here, when the distance between the reference feature parts 2102 adjacent to each other is denoted by $d_1$, the distance $d_1$ can be calculated on the basis of the positional relation between the reference feature parts 2102 denoted by the dotted lines 2103 in FIG. 18A. In addition, when the distance between the feature parts 2107 adjacent to each other is denoted by $d_2$, the distance $d_2$ can be calculated on the basis of the positional relation between the feature parts 2107 denoted by the dotted lines 2108 in FIG. 18C. The image processing device 102 calculates a ratio $d_2/d_1$ between the distances and performs correction of the zoom magnification using the ratio $d_2/d_1$.

When a correction value of the zoom magnification is denoted by ΔZ, the image processing device 102 calculates the correction value ΔZ using the following Equation (2).

$$\Delta Z = Fz^s(S_2/S_1)$$

or $$\Delta Z = Fz^d(d_2/d_1) \qquad (2)$$

$Fz^s(\ )$ represented in Equation (2) is a correction function for correcting a zoom magnification based on the ratio $S_2/S_1$. $Fz^d(\ )$ is a correction function for correcting a zoom magnification based on the ratio $d_2/d_1$. Alternatively, a correction value for the zoom magnification may be calculated using a reference table associating ΔZ with the ratio $S_2/S_1$ or a reference table associating ΔZ with the ratio $d_2/d_1$.

When the zoom magnification 1805 illustrated in FIG. 16A is denoted by Z, the image processing device 102 calculates Z+ΔZ by correcting the zoom magnification Z. The image processing device 102 transmits a correction instruction based on Z+ΔZ to the imaging device 103 in S2010 illustrated in FIG. 17.

FIG. 18D is a schematic view illustrating a case in which the rotation axis of the camera platform 201 in the direction P is close to the direction of the optical axis of the imaging system 202 of the imaging device 103. FIG. 18E is a schematic view illustrating an inclination of the feature parts in the image 2109 that may occur due to rolling of the imaging device 103. A plurality of feature parts 2110 are denoted by a frame having a rectangular shape, and positional relations among the plurality of feature parts are denoted by dotted lines 2111. The feature parts 2110 are positioned at vertexes of a rectangle represented by the four dotted lines 2111.

For example, an error in the inclination of the feature parts of image data received by the image processing device 102 in S2006 illustrated in FIG. 17 may occur. FIG. 18E illustrates an example in which the positional relation among the feature parts 2110 denoted by the dotted lines 2111 is inclined with respect to the positional relation among the reference feature parts 2102 denoted by the dotted lines 1103 illustrated in FIG. 18A. In this case, the image processing device 102 compares the positional relation of a plurality of reference feature parts 2102 (see a rectangle denoted by the dotted lines 2103) with the positional relation of a plurality of feature parts 2110 (see a rectangle denoted by the dotted lines 2111) and calculates an inclining angle between them. When this inclining angle is denoted by $\Delta\theta_1$, the image processing device 102 performs correction of the panning angle using $\Delta\theta_1$.

Alternatively, the image processing device 102 compares the positional relation (see a rectangle represented by dotted lines 2114) of a plurality of feature parts 2105 illustrated in FIG. 18B with the positional relation (see a rectangle represented by dotted lines 2111) of a plurality of feature parts 2110 illustrated in FIG. 18E. The image processing device 102 calculates an inclining angle between the plurality of feature parts 2105 and the plurality of feature parts 2110. When this inclining angle is denoted by $\Delta\theta_2$, the image processing device 102 performs correction of the panning angle using $\Delta\theta_2$. For example, a correction value ΔP of the panning angle is calculated using the following Equation (3).

$$\Delta P = Fp_1^*(\Delta\theta_1)$$

or $$\Delta P = Fp_2^*(\Delta\theta_2) \qquad (3)$$

$F_{p1}^*(\ )$ represented in Equation (3) is a correction function for the panning angle based on $\Delta\theta_1$, and $Fp_2^*(\ )$ is a correction function for the panning angle based on $\Delta\theta_2$. In addition, the correction value ΔP may be calculated using a reference table associating ΔP with $\Delta\theta_1$ or a reference table associating ΔP with $\Delta\theta_2$.

Each correction function described above is determined using design information of the system when the system is designed. Alternatively, in the process of operating the drive system of the imaging device 103 at the time of setting the system, by measuring an amount of change in the feature quantity accompanied with actual changes in the panning direction, the tilting direction, and the zoom magnification, the process of determining a correction function is executed.

In this example, a case in which the reproducibility of panning and tilting of the imaging device 103 at the time of driving thereof decreases, a case in which the reproducibility of the zoom magnification decreases, and a case in which the reproducibility of rolling decreases have been respectively described. Among theses, if two or more simultaneously occur, the system is configured such that two or more correction processes are simultaneously executed.

In this example, even if the reproducibility of an imaging position of a measurement situation is not sufficient for desired measurement accuracy or a desired recognition rate in each image processing process, the recognition rate or the measurement accuracy of image processing can be secured while executing a correction process that is necessary and sufficient. For example, in the process of loading workpieces into different conveying vehicles using the robot in accordance with types of workpieces on the basis of an image acquired by imaging the workpieces using the imaging device, by inputting a relatively small allowed error, the measurement accuracy of the image processing is improved, and the robot can be accurately controlled. On the other hand, in the process of imaging a conveying vehicle using an imaging device and determining whether or not the conveying vehicle is present within a stop frame, by inputting a relatively large allowed error, image measurement can end in a short time. According to this example, image processing can be performed in a shorter time while securing the reproducibility of an imaging position in accordance with a designated determination condition.

Fifth Example

Next, a fifth example of the present invention will be described. In the fourth example, although a reference image area needs to be designated by a user operation, an image processing device capable of automatically or semi-automatically determining a reference image area will be described in this example. Even a user having little knowledge about an image feature can set a preferable reference image area, and accordingly, dependency on individuals at the time of setting can be reduced. A system configuration according to this example is similar to that according to the fourth example, and thus, detailed description thereof will be omitted by using the reference signs that have already been used.

Figure 19:
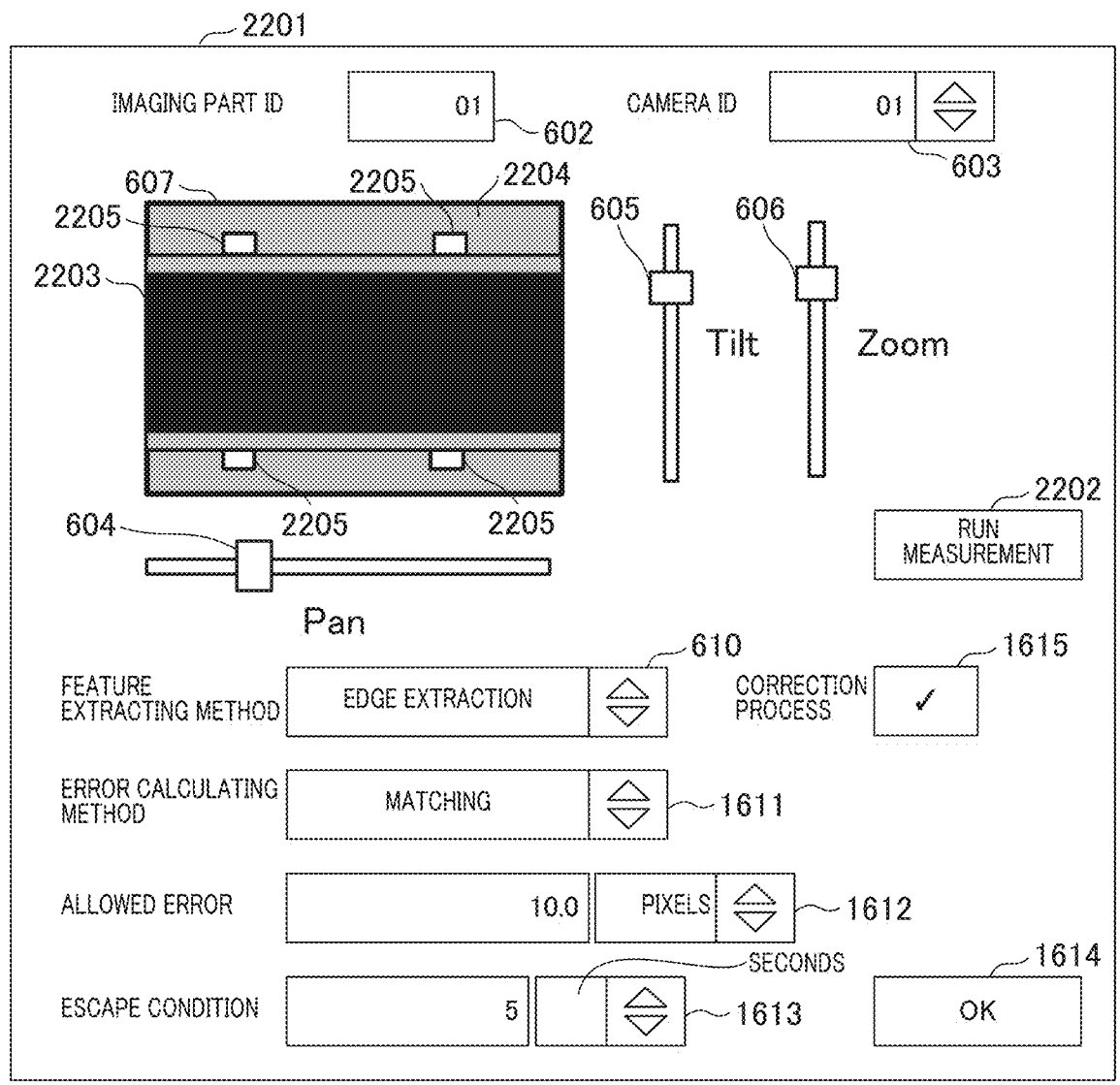
FIG. 19 is a diagram illustrating a reference feature registration processing screen according to a fifth example.

FIG. 19 illustrates an example of a reference feature registration processing screen in an image processing device 102 of this example. A sequence diagram of a reference feature registering process according to the fifth example is similar to that illustrated in FIG. 13. Hereinafter, points different from those of the fourth example will be mainly described. On a registration screen 2201 illustrated in FIG. 19, a button 2202 of running measurement is added. A user can instruct running of measurement performed a plurality of number of times by operating the button 2202.

The user operates bars 604 to 606 while looking at the reference feature registration screen 2201. The image processing device 102 controls an imaging direction by performing driving control of a camera platform 201 of an imaging device 103. A captured image that is captured by the imaging device 103 is displayed in an image display area 607. Here, when a user performs a clicking operation for a button 1202, the image processing device 102 transmits an imaging instruction to the imaging device 103 (FIG. 13: S1201). The imaging device 103 performs imaging a predetermined number of times (S1202) and transmits data of all the images to the image processing device 102 (S1203).

The image processing device 102 calculates an area having little variation from the image data received from the imaging device 103 (S1204) and displays an area 2203 having a large variation in black. Next, the image processing device 102 calculates an area having a large feature quantity in an area having little variation. Here, an area having a large feature quantity, for example, is an area in which the contrast is clear. The image processing device 102 displays an area 2204 having a small feature quantity in gray in the image display area 607 (S1205). Then, the image processing device 102 determines an area 2205 having a large feature quantity as a reference image area (S1206).

In this example, for example, an image area having a smallest variation in an image area acquired through measurement performed over a plurality of number of times is automatically set as a reference image area. Alternatively, an area having a largest feature quantity in an area having little variation is automatically set as a reference image area with high priority by the image processing device 102. Instead of such an automatic process, a semi-automatic process in which one or a plurality of areas having little variation and a large feature quantity are presented to a user as candidates for a reference image area, and the user performs a selection operation may be performed. In such a case, a process of prompting the user to select a reference image area is performed. Candidates for an area 2205 having little variation and a large feature quantity, for example, are presented to a user in white display in the image display area 607, and the user can designate a desired area as the reference image area.

In this example, even a user who has little knowledge about an image feature can set a preferable reference image area. In addition, dependency on individuals at the time of setting is reduced, and a process that is not easily influenced by the degree of individual skill can be performed.

Other Example

In the examples, while an embodiment having a configuration in which the control device 101, the image processing device 102, and the imaging device 103 are separate components has been described, the present invention is not limited to such an example. For example, there is an imaging device including an image processing unit corresponding to the image processing device 102 and an imaging unit, which corresponds to the imaging device 103, capable of changing an imaging direction and an imaging angle of view inside one device. Alternatively, there is an imaging device including components respectively corresponding to the control device 101, the image processing device 102, and the imaging device 103 inside one device. Such imaging devices belong to the technical scope of the present invention.

In addition, in the examples described above, although an example in which determination conditions are set on the basis of an input received from a user has been described, the configuration of the present invention is not limited to the example described above.

For example, the image processing device 102 may automatically select determination conditions to be applied from a plurality of determination conditions prepared in a data table in advance. In addition, the image processing device 102 may measure the size of a workpiece 108 to be gripped by the robot 104 and automatically change the determination condition in accordance with the measured size of the workpiece 108.

In addition, in the example described above, although an example in which a reference image area is set in a captured image, and the image processing device 102 extracts reference features from the reference image area has been described, the configuration of the present invention is not limited to the example described above.

For example, a case in which a workpiece 108 is conveyed by driving the conveying device 105 after the imaging position of the imaging device 103 is set will be assumed. In the case described above, there is no workpiece 108 on the conveying device 105 when a captured image is acquired, and an area of which the position or inclination changes in accordance with the elapse of time is not included in the captured image. Accordingly, in the case described above, the image processing device 102 can determine the statically determinate state of the imaging device 103 and securing of the position reproducibility using the entire captured image without setting a reference image area of the captured image.

In addition, the image processing device 102 may search for a position at which a difference between images becomes minimal while shifting the positions of a captured image and a reference image from each other. In the case described above, even when feature parts of an image included in a predetermined reference image area are not extracted from a captured image, the statically determinate state of the imaging device 103 and securing of the position reproducibility can be determined using the entire captured image.

In addition, in the fourth example described above, the image processing device 102 may change an allowed error for the reproducibility of the imaging position of the imaging device 103 in accordance with details of the process performed by the robot 104. For example, also in a case in which the imaging position is the same, the image processing device 102 may change an allowed error for the reproducibility of the imaging position in accordance with the type of workpiece 108 conveyed by the conveying device 105. More specifically, if the workpiece 108 conveyed by the conveying device 105 is large, the image processing device 102 may set the allowed error to be larger than that of a case in which the workpiece 108 is small. Alternatively, in a case in which the shape of the workpiece 108 conveyed by the conveying device 105 is a simple shape, the image processing device 102 may set the allowed error to be larger than that of a case in which the shape of the workpiece 108 is complex.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129070, filed Jul. 6, 2018 and Japanese Patent Application No. 2018-129182, filed Jul. 6, 2018 which is hereby incorporated by reference wherein in its entirety.

What is claimed is:

1. An image processing device that processes data of a captured image acquired by imaging a measurement target using an imaging unit capable of changing an imaging direction or an imaging angle of view, comprising: at least one processor functioning as:
    a calculation unit configured to calculate an evaluation value on the basis of a captured image acquired at an imaging position at a time of measurement by the imaging unit and reference features of the image;
    an image processing unit configured to acquire the data of the captured image using the imaging unit and perform image processing;
    a first setting unit configured to set determination conditions used for determining reproducibility of an imaging position of the imaging unit; and
    a control unit configured to perform control of performing image processing of the captured image using the image processing unit and outputting a result of the image processing if the evaluation value calculated by the calculation unit satisfies the determination condition set by the first setting unit.

2. The image processing device according to claim 1, wherein the determination condition includes a threshold, and
    wherein the control unit determines whether or not image processing of the captured image is performed using the image processing unit by comparing the evaluation value with the threshold.

3. The image processing device according to claim 2, wherein the determination condition is selected from a plurality of determination levels, and
    wherein the control unit determines whether or not image processing of the captured image is performed using the image processing unit by comparing the evaluation value calculated by the calculation unit with the threshold corresponding to a determination level selected from the plurality of determination levels.

4. The image processing device according to claim 1, wherein the calculation unit identifies information representing an amount of vibration of the imaging unit on the basis of the captured image and sets the information representing the amount of vibration as the evaluation value.

5. The image processing device according to claim 4, wherein the determination condition further includes a measurement interval and a measurement time, and
    wherein the control unit determines whether or not image processing of the captured image is performed using the image processing unit by comparing the evaluation value calculated by the calculation unit with the threshold on the basis of a result of measurement using the measurement interval and the measurement time.

6. The image processing device according to claim 5, wherein the control unit issues a predetermined notification if it is determined that an amplitude of the amount of vibration calculated within the measurement time by the calculation unit is not less than the threshold.

7. The image processing device according to claim 4, wherein the determination condition is acquired by combining a measurement interval, a measurement time, and a threshold corresponding to the determination level in advance.

8. The image processing device according to claim 4, wherein the control unit determines that image processing of the captured image is performed using the image processing unit if the evaluation value becomes less than threshold.

9. The image processing device according to claim 1, wherein the calculation unit sets information representing a difference between positions of feature parts extracted in an image area, which includes the reference features, of the captured image and positions of the reference features as the evaluation value.

10. The image processing device according to claim 9, further comprising a correction unit configured to cause the imaging unit to correct the imaging position if the evaluation value calculated by the calculation unit does not satisfy the determination condition.

11. The image processing device according to claim 10, wherein the determination condition includes a threshold of the difference calculated by the calculation unit and a condition for limiting the correction of the imaging position using the correction unit.

12. The image processing device according to claim 11,
wherein the correction unit performs the correction for the number of times or at a time representing the condition limiting the correction of the imaging position, and
wherein the control unit performs image processing of the captured image using the image processing unit if the difference calculated by the calculation unit in the captured image acquired at the imaging position corrected by the correction unit is equal to or smaller than the threshold and performs a process of notifying that reproducibility of the imaging position cannot be secured if the difference calculated by the calculation unit is larger than the threshold even when the correction unit performs correction of the imaging position for the number of times or at the time.

13. The image processing device according to claim 12, wherein the control unit performs control of updating a set value of the imaging position using a correction value for the imaging position according to the correction unit or history data of the correction value.

14. The image processing device according to claim 1, further comprising a second setting unit configured to perform a process of setting a reference image area that is a reference in the captured image on the basis of a user operation and setting feature parts of the image in the reference image area as the reference features.

15. The image processing device according to claim 14, wherein the second setting unit sets image areas having little variation among image areas acquired through measurement performed over a plurality of number of times as candidates for the reference image area.

16. The image processing device according to claim 14, wherein the second setting unit performs a process of setting an image area other than an image area corresponding to the measurement target as the reference image area.

17. The image processing device according to claim 1, wherein the first setting unit sets the determination condition on the basis of a user operation.

18. The image processing device according to claim 1, further comprising a driving control unit configured to perform control of changing an imaging direction or an imaging angle of view of the imaging unit by controlling a drive unit of the imaging unit and set an imaging position of the measurement target.

19. The image processing device according to claim 1, wherein a result of the image processing is output to a control device that controls a robot conveying a workpiece.

20. The image processing device according to claim 1, further comprising the imaging unit.

21. The image processing device according to claim 1, further comprising a robot control unit that controls a robot on the basis of an output result of the image processing.

22. An image processing device control method executed by an image processing device that processes data of a captured image acquired by imaging a measurement target using an imaging unit capable of changing an imaging direction or an imaging angle of view, the control method comprising:
calculating an evaluation value on the basis of a captured image acquired at an imaging position at a time of measurement by the imaging unit and reference features of the image;
acquiring the data of the captured image using the imaging unit and performing image processing;
setting determination conditions used for determining reproducibility of an imaging position of the imaging unit; and
performing control of performing image processing of the captured image and outputting a result of the image processing if the calculated evaluation value satisfies the determination condition according to the setting.

23. A non-transitory recording medium storing a computer program for causing a computer of an image processing device which processes data of a captured image acquired by imaging a measurement target using an imaging unit capable of changing an imaging direction or an imaging angle of view, to perform each step of a control method of the computer, the method comprising:
calculating an evaluation value on the basis of a captured image acquired at an imaging position at a of measurement by the imaging unit and reference features of the image;
acquiring the data of the captured image using the imaging unit and performing image processing;
setting determination conditions used for determining reproducibility of an imaging position of the imaging unit; and
performing control of performing image processing of the captured image and outputting a result of the image processing if the calculated evaluation value satisfies the determination condition according to the setting.

* * * * *